(12) United States Patent
Smith

(10) Patent No.: US 10,358,903 B2
(45) Date of Patent: Jul. 23, 2019

(54) DOWNHOLE CLUTCH JOINT FOR MULTI-DIRECTIONALLY ROTATING DOWNHOLE DRILLING ASSEMBLY

(71) Applicant: Gary Smith, Houston, TX (US)

(72) Inventor: Gary Smith, Houston, TX (US)

( * ) Notice: Subject to any disclaimer, the term of this patent is extended or adjusted under 35 U.S.C. 154(b) by 0 days.

(21) Appl. No.: 16/271,563

(22) Filed: Feb. 8, 2019

(65) Prior Publication Data
US 2019/0169973 A1    Jun. 6, 2019

Related U.S. Application Data

(63) Continuation-in-part of application No. 15/685,545, filed on Aug. 24, 2017, which is a continuation of
(Continued)

(51) Int. Cl.
*E21B 17/04*    (2006.01)
*E21B 44/00*    (2006.01)
(Continued)

(52) U.S. Cl.
CPC .............. *E21B 44/005* (2013.01); *E21B 3/00* (2013.01); *E21B 4/006* (2013.01); *E21B 4/16* (2013.01); *E21B 7/04* (2013.01); *E21B 7/068* (2013.01); *E21B 45/00* (2013.01); *E21B 47/024* (2013.01); *E21B 47/06* (2013.01); *E21B 47/122* (2013.01); *E21B 47/18* (2013.01); *G05B 15/02* (2013.01); *G05B 19/406* (2013.01); *G05B 2219/45129* (2013.01)

(58) Field of Classification Search
CPC .............................. E21B 17/06; E21B 31/107
See application file for complete search history.

(56) References Cited

U.S. PATENT DOCUMENTS 3,321,018 A * 5/1967 McGill .................. E21B 41/00
166/117.7
3,552,492 A * 1/1971 Mullins .................. E21B 23/06
166/237
(Continued)

*Primary Examiner* — Kipp C Wallace
(74) *Attorney, Agent, or Firm* — Keeling Law, LLC; Kenneth A. Keeling; Mark S. Solomon

(57) ABSTRACT

Embodiments of a downhole drilling assembly generally include rotatable upper and lower drilling assemblies, and a drill bit, wherein an upper drilling assembly contains a mud motor adapted for clockwise stator rotation and counter-clockwise rotor rotation, whereby a lower drilling assembly is rotatable in the opposite direction of the upper drilling assembly or maintainable in a non-rotating state. The apparatus further includes sensors for continuously transmitting information relating thereto to the surface.

Embodiments of a downhole clutch joint generally include a box end sub, a pin end sub, and a ratchet sleeve system containing a clutch joint mechanism, wherein the downhole clutch joint prevents rotation of a downhole drilling assembly in an undesired direction.

Method embodiments generally include continuously measuring physical properties and/or drilling parameters, continuously transmitting information relating thereto, and controlling lower drilling assembly rotation in a non-rotating state or in the opposite direction of an upper drilling assembly.

20 Claims, 16 Drawing Sheets

Related U.S. Application Data application No. 15/293,800, filed on Oct. 14, 2016, now Pat. No. 9,771,787, which is a continuation of application No. 14/721,644, filed on May 26, 2015, now Pat. No. 9,506,335.

(60) Provisional application No. 62/003,435, filed on May 27, 2014.

(51) Int. Cl.

| | | |
|---|---|---|
| *E21B 7/04* | (2006.01) | |
| *E21B 47/024* | (2006.01) | |
| *E21B 47/06* | (2012.01) | |
| *E21B 47/12* | (2012.01) | |
| *E21B 45/00* | (2006.01) | |
| *G05B 19/406* | (2006.01) | |
| *E21B 7/06* | (2006.01) | |
| *E21B 4/16* | (2006.01) | |
| *E21B 4/00* | (2006.01) | |
| *E21B 47/18* | (2012.01) | |
| *G05B 15/02* | (2006.01) | |
| *E21B 3/00* | (2006.01) | |

(56) References Cited

U.S. PATENT DOCUMENTS

| | | | | |
|---|---|---|---|---|
| 4,319,646 | A * | 3/1982 | Emonet | E21B 6/06 |
| | | | | 173/111 |
| 6,158,563 | A * | 12/2000 | Welfonder | E06B 9/90 |
| | | | | 160/291 |
| 7,467,672 | B2 * | 12/2008 | Cruickshank | E21B 7/067 |
| | | | | 175/106 |
| 8,833,491 | B2 * | 9/2014 | Sonar | E21B 4/006 |
| | | | | 166/240 |
| 10,221,644 | B2 * | 3/2019 | Swinford | E21B 31/18 |
| 2006/0089593 | A1 * | 4/2006 | Landau | A61M 5/30 |
| | | | | 604/68 |
| 2009/0056497 | A1 * | 3/2009 | Swinford | E21B 17/073 |
| | | | | 74/640 |
| 2009/0183921 | A1 * | 7/2009 | Gurjar | E21B 7/067 |
| | | | | 175/61 |
| 2009/0218143 | A1 * | 9/2009 | Sanfelice | E21B 7/061 |
| | | | | 175/62 |
| 2011/0308784 | A1 * | 12/2011 | Ollerenshaw | E21B 17/06 |
| | | | | 166/72 |
| 2017/0234081 | A1 * | 8/2017 | Kirkhope | E21B 7/062 |
| | | | | 166/378 |

* cited by examiner

DOWNHOLE CLUTCH JOINT FOR MULTI-DIRECTIONALLY ROTATING DOWNHOLE DRILLING ASSEMBLY

CROSS-REFERENCE TO RELATED APPLICATIONS

This application is a continuation-in-part of prior U.S. patent application Ser. No. 15/685,545, filed Aug. 24, 2017, which is a continuation of prior U.S. patent application Ser. No. 15/293,800, filed Oct. 14, 2016, now U.S. Pat. No. 9,771,787, which is a continuation of prior U.S. patent application Ser. No. 14/721,644, filed May 26, 2015, now U.S. Pat. No. 9,506,335, which claims the benefit of U.S. Provisional Patent Application No. 62/003,435, filed May 27, 2014, which applications are all incorporated herein by reference as if reproduced in full below.

STATEMENT REGARDING FEDERALLY SPONSORED RESEARCH OR DEVELOPMENT

Not applicable.

FIELD OF THE DISCLOSURE

The present invention relates generally to a rotary steerable downhole drilling assembly to be utilized in the formation of a subsurface wellbore. The invention also relates to a method for forming a subsurface wellbore utilizing embodiments of this apparatus. The invention further relates to an apparatus and method for obtaining and transmitting to the surface certain downhole physical measurements and drilling parameters to assist in controlling downhole operations. The invention additionally relates to clutch assembly for preventing rotation in an undesired direction.

BACKGROUND

Wellbore formation typically entails use of a rotating drilling string, to the end of which is connected a rotating drilling device. Directional drilling, i.e, drilling on a curved path, is well known within the art. See, for example, U.S. Pat. No. 8,881,846 to Sitka; U.S. Pat. No. 8,567,528 to Comeau, et al.; U.S. Pat. No. 8,381,839 to Rosenhauch; U.S. Pat. No. 8,151,907 to McDonald; U.S. Pat. No. 7,946,361 to Gurjar, et al.; U.S. Pat. No. 5,857,531 to Estep, et al.; U.S. Pat. No. 5,535,835 to Walker; and U.S. Pat. No. 5,727,641 to Eddison, each of which is incorporated herein by reference in its entirety. Due to friction and other subsurface forces, operation of the drilling assembly results in a significant amount of torque being applied to the drill string. There is prior art wherein attempts have been made to address the torque problem. For example, U.S. Pat. No. 8,151,907 to McDonald discloses a method and system for forming a subsurface wellbore wherein a drill string rotates in one direction and near the end of the drill string an inverted motor rotates a bottom hole assembly in the opposite direction. U.S. Pat. No. 8,567,528 to Comeau, et al. discloses a method and system for forming a subsurface wellbore wherein a drill string rotates in one direction and near the end of the drill string a control assembly manipulates a poppet to maintain a bottom hole assembly in a rotationally stationary position. It would be advantageous to have a device and method that better compensate for drill string torque and improve directional control of the drilling assembly.

BRIEF SUMMARY OF THE INVENTION

Embodiments of the present invention generally comprise an apparatus and method wherein a downhole drilling assembly, also referred to as a bottom hole assembly ("BHA"), includes a means of controlling the rotation of a plurality of directional drilling motors. More specifically, embodiments of the present invention allow for rotation of a portion of the downhole drilling assembly, proximate the drilling device, in the same direction that the drill string rotates or in the direction opposite to that which the drill string rotates; and also allows for zero rotation, wherein that portion of the downhole drilling assembly proximate the drilling device does not rotate. Embodiments of the present invention allow for substantially continuous rotational control of the downhole drilling assembly, proximate the drilling device, which can thereby be rotated in either direction, over a range of rotational velocities, or maintained in a non-rotating, or "geo-stable," position. Embodiments of the present invention further comprise a sensor assembly and method for obtaining physical measurements and/or evaluating drilling parameters proximate the drilling device on a substantially continuous basis and transmitting data containing and/or derived from the physical measurements and/or drilling parameters to the surface, where it can be received, processed, and used to control the downhole drilling assembly of the present invention. Additional embodiments of the invention include a power production component and/or power storage component of the downhole drilling assembly, as well as a downhole clutch joint comprising a ratchet sleeve system comprising a toothed clutch joint mechanism.

BRIEF DESCRIPTION OF THE DRAWINGS

For a more complete understanding of the exemplary embodiments, reference is now made to the following Detailed Description of Exemplary Embodiments of the Invention, taken in conjunction with the accompanying drawings, in which.

DETAILED DESCRIPTION OF EXEMPLARY EMBODIMENTS OF THE INVENTION

Figure 1:
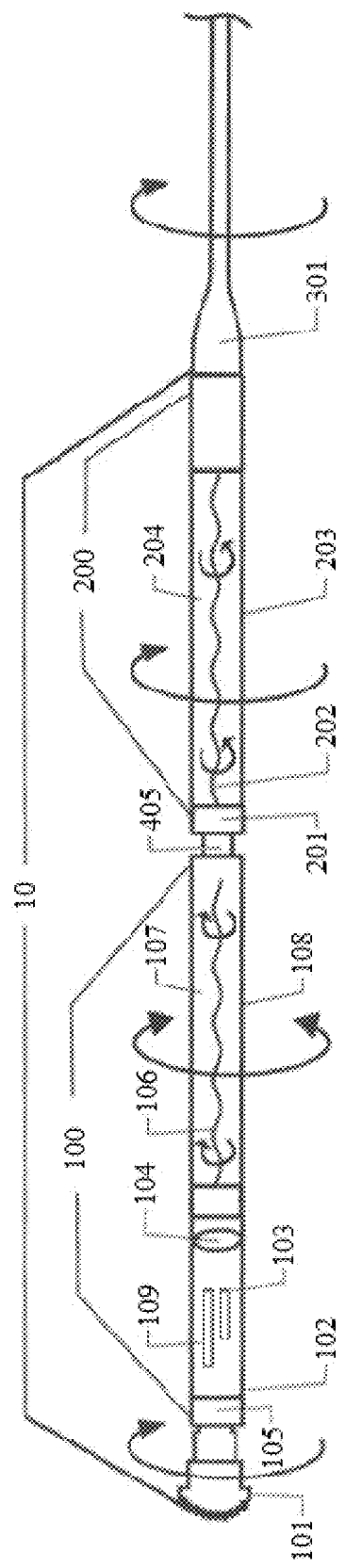
FIG. 1 depicts an embodiment of the downhole drilling assembly of the present invention.

The exemplary embodiments are best understood by referring to the drawings, like numerals and letters being used for like and corresponding parts or features of the various drawings. The directions lower and upper as used in this specification are used for descriptive purposes only and it will be understood by one having skill in the art that different orientations are possible.

Figure 2:
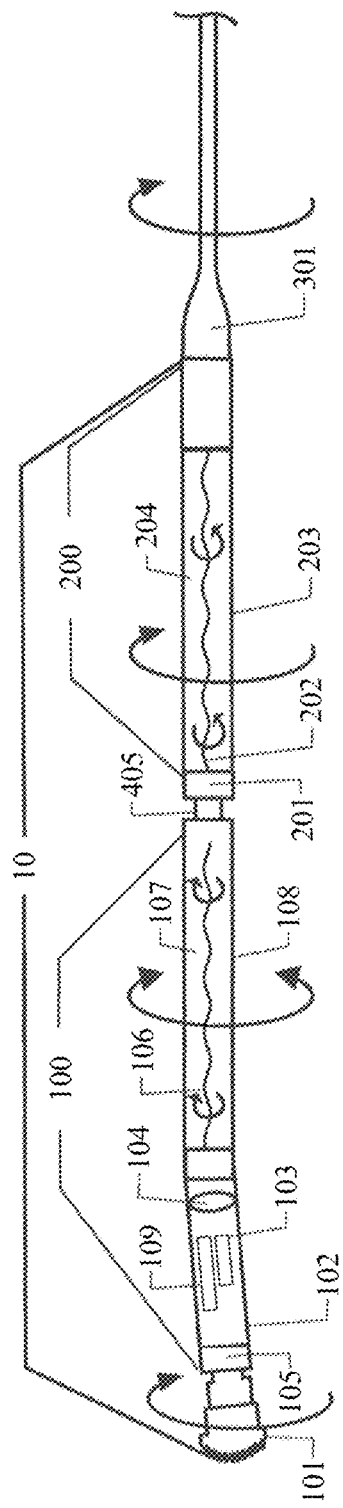
FIG. 2 depicts an embodiment of the downhole drilling assembly of the present invention.

Referring to the embodiments depicted in FIGS. 1 and 2, downhole drilling assembly 10 comprises rotatable lower drilling assembly ("LDA") 100, rotatable upper drilling assembly ("UDA") 200, and a drilling device 101, such as a drill bit. Upper drilling assembly 200 is connected to a drill string 301. Lower drilling assembly 100 is connected to drill bit 101.

As known in the art, drill bit 101 may comprise any drill bit useful in a particular downhole drilling environment. In one embodiment, drill bit 101 is a conventional fixed cutter bit, such as, but not limited to, a polycrystalline diamond compact (PDC), grit hot-pressed insert (GHI), or natural diamond mud drill bit. In another embodiment, drill bit 101 is a conventional roller cone bit, such as, but not limited to, a tungsten carbide insert (TCI) or milled tooth (MT) drill bit.

Disposed within lower drilling assembly 100 is at least one drilling sensor assembly 103. In an embodiment of the present invention, drilling sensor assembly 103 is disposed proximate drill bit 101. In one embodiment, drilling sensor assembly 103 is disposed proximate a first motor 108 and above a bearing assembly 105. In one embodiment, drilling sensor assembly 103 is disposed radially over a drive shaft (not shown) which connects rotor 106 to bearing assembly 105. In one embodiment, sensor assembly 103 is disposed in a pressure sealed housing (not shown) along with other components such as one or more optional batteries 109 and/or additional control electronics (not shown). Although drilling sensor assembly 103 and batteries 109 are depicted in FIGS. 1-3 in a substantially parallel arrangement, the invention is not so limited and other orientations may be employed.

Drilling sensor assembly 103 includes devices (not shown), such as sensors, utilized in measurement while drilling (MWD), and/or logging while drilling (LWD), and adapted to obtain information related to physical properties and/or drilling parameters/conditions such as, but not limited to, gamma rays, inclination, azimuth, pressure, strain, vibration, stick-slip, tool face orientation/alignment, resistivity, density, seismology, neutron porosity, borehole diameter (caliper), nuclear magnetic resonance. In one embodiment sensor assembly 103 includes at least one of a total gamma ray sensor, a spectral gamma ray sensor, an inclination sensor, an azimuthal gamma ray sensor, a pressure sensor, a strain sensor, a resistance sensor, a density sensor, a neutron porosity sensor, and a tool face orientation/alignment sensor. In one embodiment, orientation/alignment is determined by accelerometers measuring in 3 orthogonal directions, and one or more magnetometers. In one embodiment, pressure and/or strain gauges measure parameters such as weight on bit (WOB), torque, and bending.

In one embodiment, lower drilling assembly 100 also comprises a sensor transmission unit 104. Sensor transmission unit 104 is adapted to transmit information obtained by one or more of the sensors on a substantially continuous basis to a remote location, such as logic assembly 405. Sensor information may be transmitted to logic assembly 405 wirelessly and/or via wires. In one embodiment, sensor information is transmitted to logic assembly 405 via a cable (not shown) mounted in a longitudinal groove (not shown) along first motor 108 and is protected from the drilling environment with a thick sleeve (not shown) that is slid over the groove and is rotationally and longitudinally held in place. In one embodiment, pressure connectors (not shown) are disposed on both ends of the cable that allow cable wires to communicate sensor information while excluding contaminants. In one embodiment, sensor assembly 103 may include an antenna (not shown) to facilitate wireless transmission/reception, such as transmission of sensor information to logic assembly 405. Sensor transmission unit 104 may be adapted to transmit commands received, wirelessly and/or via wires, from a remote location, such as logic assembly 405, to one or more sensors.

Figure 3:
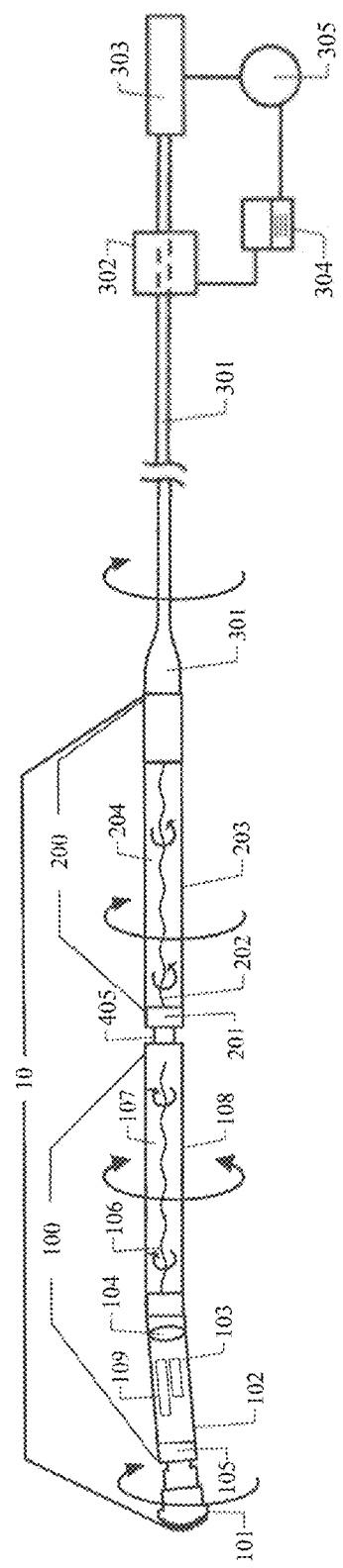
FIG. 3 depicts an embodiment of the downhole drilling assembly of the present invention as well as embodiments of various additional components.

In an embodiment of the invention depicted in FIG. 3, sensor transmission unit 104 transmits information to a logic assembly 405 disposed intermediate first motor 108 and a second motor 203. In one embodiment, logic assembly 405 is adapted to receive the sensor information, convert the information into another form, if necessary, and transmit the information, directly or indirectly, to a processing device 302 located at or near the surface of the well, via a method such as mud pulse telemetry. In one embodiment, processing device 302 comprises an MWD receiver/decoder which may utilize a pressure transducer (not shown). As will be further described, processing device 302 may be adapted to provide information that may be utilized to control various aspects of the drilling operation, including but not limited to, drilling direction, drilling force (WOB), mud flow rate, and rate of rotation of drill string 301.

Figure 5:
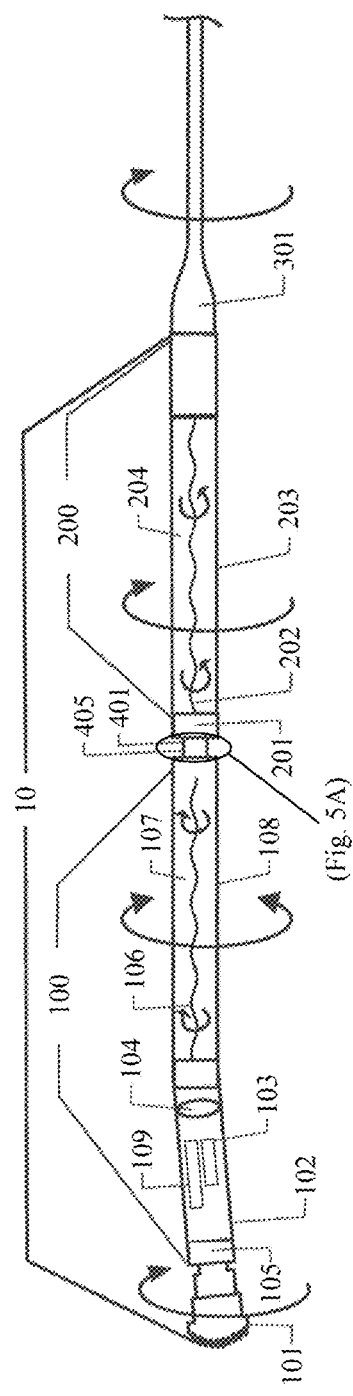
FIG. 5 depicts an embodiment of a downhole drilling assembly of the present invention.
Figure 5A:
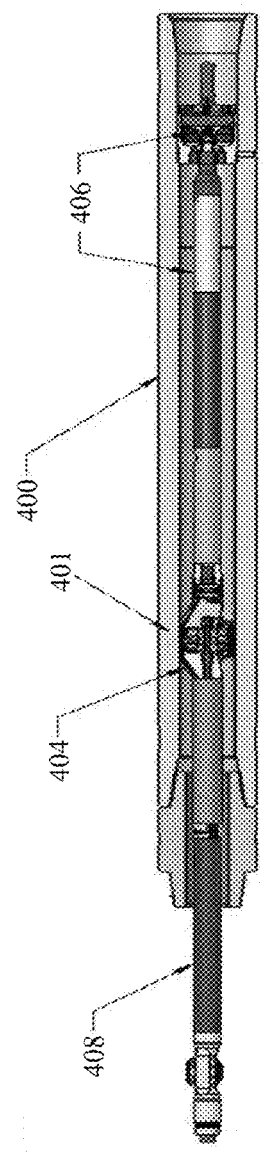
FIG. 5A depicts an expanded view of the embodiment of FIG. 5.
Figure 6:
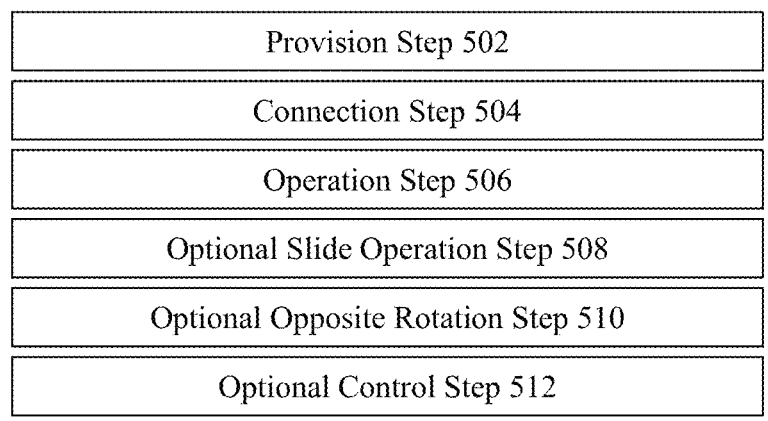
FIG. 6 depicts an embodiment of a method of the present invention.

In one embodiment, as depicted in FIGS. 5 and 5A, downhole drilling assembly 10 comprises a power generation system 401 intermediate first motor 108 and second motor 203. In one embodiment, optional power generation system 401 and/or batteries 109 are utilized to provide electrical power to one or more sensors, sensor transmission unit 104, logic assembly 405, an electronic module 408, a pulser 406, and/or one or more additional control electronics (not shown). In one embodiment, batteries 109 provide an electrical power backup in the event of failure of power generation system 401. In one embodiment, batteries 109 may comprise rechargeable batteries which can be recharged by power generation system 401. Wires (not shown) electrically connect power generation system 401 and/or batteries 109, directly or indirectly, to the components that operate via electrical power.

As shown in detail in the embodiment depicted by FIG. 5A, power generation system 401 is disposed within a collar 400. In one embodiment, power generation system 401 comprises a fluid driven turbine 402 comprising an alternator 404 adapted to convert fluid flow energy into electrical energy. In one embodiment, batteries 109 may be disposed within collar 400.

As also shown in greater detail in the embodiment of FIG. 5A, logic assembly 405 may comprise a device 406, such as, but not limited to an MWD pulse generator ("pulser"), adapted to transmit information to processing device 302 via a method such as mud pulse telemetry (MPT), a binary coding transmission system used with fluids. In the embodiment shown in FIG. 5A, logic assembly 405 also comprises electronic module 408. Although the embodiment of FIG. 5A depicts pulser 406 and electronic module 408 as being linearly aligned on opposites sides of power generation system 401, the invention is not so limited and other arrangements may be employed, as would be understood by one skilled in the art. Electronic module 408 is communicatively connected, directly or indirectly, via wires and/or wirelessly, with pulser 406. In one embodiment, electronic module 408 may include an antenna (not shown) to facilitate wireless transmission/reception, such as transmission of information to pulser 406.

Electronic module 408 is communicatively connected, directly or indirectly, with the one or more sensors, via wires and/or wirelessly. In one embodiment, electronic module 408 receives sensor information from sensor transmission unit 104. Electronic module 408 may also store the received sensor information. In one embodiment, electronic module 408 is adapted to query one or more sensors, directly or indirectly, for information.

In operation, electronic module 408 comprises one or more individual components (not shown) that are adapted to perform various functions, including but not limited to, one or more of the following aspects of the invention. In various aspects, electronic module 408 provides for reception of sensor information obtained from one or more sensors, storage of that information, calculations based on that information, and storage of such calculations. In another aspect, electronic module 408 provides for transmission of commands to one or more sensors, such as commands comprising but not limited to, requests/instructions for one or more measurements to be obtained by a sensor. In other aspects, electronic module 408 provides for transmission of information to pulser 406 and commands related to operation of pulser 406. In additional aspects, electronic module 408 provides for detection of a failure of power generation system 401, and for switching between electronic component operation via power generation system 401 provided electrical energy or battery power.

In the embodiment of the invention depicted in FIG. 3, processing device 302 receives information from pulser 406 and transmits the information to a computing device 304 adapted to compile, process, analyze, or otherwise manipulate the information. In one embodiment, control information is then transmitted from computing device 304 to a control device 305 that may comprise an automatic driller unit adapted to determine drilling parameters. In one embodiment, the drilling parameter information determined by control device 305 is transmitted to a component 303, such as rig top drive unit, that is adapted to control and adjust rotation of drill string 301. The drilling parameter information may also be used to adjust and/or control additional operational drilling parameters, such as mud flow rate and WOB. In one embodiment of the present invention, due to the substantially continuous transmission of downhole information to the surface, no down links or shut downs are required to control downhole drilling assembly 10 via control device 305.

Disposed within lower drilling assembly 100 is a first motor 108 adapted to provide operational force to drill bit 101. First motor 108 is operationally connected to drill bit 101. In one embodiment, first motor 108 is a conventional mud motor as generally known to and understood by those skilled in the art. In one embodiment, first motor 108 comprises a bent sub or bent housing steerable motor. In the embodiment of the invention depicted in FIGS. 2 and 3, lower drilling assembly 100 comprises a bent sub housing 102.

First motor 108 includes stator 107 and rotor 106. First motor rotor 106 is operationally connected to drill bit 101. First motor stator 107 is connected to a first motor housing (not shown). In one embodiment, lower drilling assembly 100 also comprises a bearing assembly 105 that comprises radial and thrust bearings to stabilize a first motor shaft (not shown). In one embodiment, first motor rotor 106 is operationally connected to drill bit 101 via bearing assembly 105.

A second motor 203 is disposed within upper drilling assembly 200 and is operationally connected to lower drilling assembly 100. In one embodiment, second motor 203 is a mud motor, configured however, to provide rotor rotation in a direction opposite that of first motor 108. Second motor 203 includes stator 204 and rotor 202. Second motor stator 204 is connected to a second motor housing (not shown). Second motor 203 is adapted to provide rotational force in a direction opposite that of drill string 301. In one embodiment, second motor rotor 202 is connected to lower drilling assembly 100. More specifically, second motor rotor 202 is connected to first motor stator 107. In one embodiment, upper drilling assembly 200 comprises a bearing assembly 201 that comprises both radial and thrust bearings to stabilize a second motor shaft (not shown). In one embodiment, second motor rotor 202 is operationally connected to first motor stator 107 via bearing assembly 201.

Figure 4:
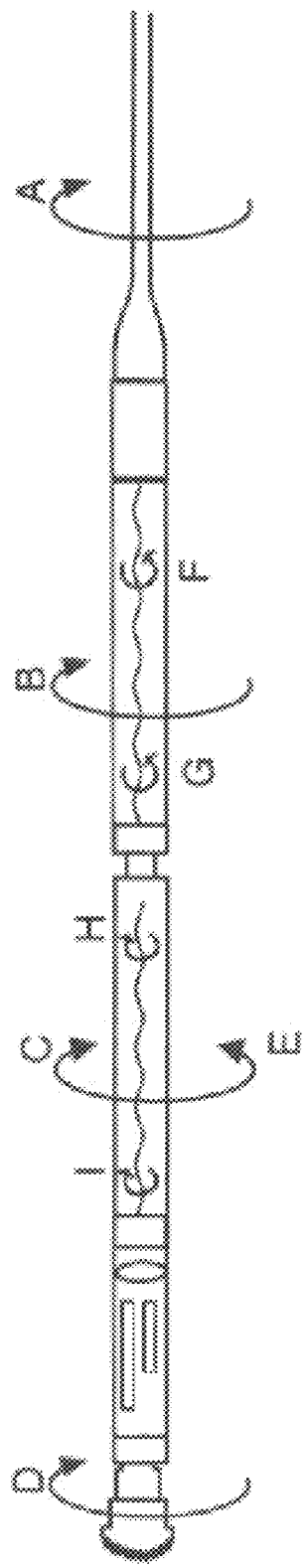
FIG. 4 depicts the rotational direction(s) of various parts of an embodiment of the downhole assembly of the present invention.

In an embodiment of the invention depicted in FIG. 4, in which components comparable to those specifically identified in FIGS. 1-3 are un-labeled to provide clarity, rotational force in the direction of rotation of drill string 301 (as depicted by arrow "A") is provided to upper drilling assembly 200 by rotation of drill string 301 (as depicted by arrow "B"). Rotation of drill string 301 is provided at the well surface by rotation of a top drive (not shown) included in rig top drive unit 303 connected to drill string 301. Fluid flow through second motor 203 rotates second motor rotor 202 in the opposite direction (as depicted by arrows "F" and "G"). Fluid flow through first motor 108 turns first motor rotor 106 in the first direction, as depicted by arrows "H" and "I." First motor rotor 106 and second motor rotor 202 are thus both operating, but are rotating in opposite directions, as depicted by arrows "H" and "G." First motor 108 provides rotational force to drill bit 101 in the same direction of rotation (as depicted by arrow "D"). As would be understood by one skilled in the art, in one aspect, rotation of upper drilling assembly 200 provides rotational force to lower drilling assembly 100 (as depicted by arrow segment "C") via frictional force between contacting surfaces (not shown) of upper drilling assembly 200 (or components connected thereto) and lower drilling assembly 100 (or components connected thereto).

Under operating conditions of an embodiment of the present invention, lower drilling assembly 100 is therefore provided rotational force from two oppositely rotating sources. That is, rotational force in a first direction is provided from the rotation of upper drilling assembly 200 by drill string 301, and rotational force in the opposite direction is provided from fluid flow by second motor rotor 202. Due to the application of opposing forces, rotation, if any, of lower drilling assembly 100, is determined by the net effect of these opposing rotational forces. In one aspect, when the force provided from the rotation of upper drilling assembly 200 to lower drilling assembly 100 equals the force provided to lower drilling assembly 100 by second motor rotor 202, lower drilling assembly 100 ceases to rotate. When the force provided to lower drilling assembly 100 by the rotation of upper drilling assembly 200 is greater than the rotational force provided to lower drilling assembly 100 by second motor rotor 202, lower drilling assembly 100 rotates in the first direction (as depicted by arrow segment "C" in FIG. 4). When the force provided to lower drilling assembly 100 from the rotation of upper drilling assembly 200 is less than the rotational force provided to lower drilling assembly 100 by second motor rotor 202, lower drilling assembly 100 rotates in the opposite direction, as depicted by arrow segment "E" in FIG. 4. In this embodiment, rotational control of lower drilling assembly 100 is obtained by proportioning the magnitude of the forces provided to lower drilling assembly 100 by the rotation of upper drilling assembly 200 (from rotation of drill string 301) and second motor 203 (from mud flow). In one aspect wherein fluid flow rate down hole is held constant, simply rotating drill string 301 at different speeds will allow for complete rotational control of downhole assembly 10. In such event, the rotation, if any, of lower drilling assembly 100 may be thus determined and adjusted at the surface of the wellbore via rig top drive unit 303.

As one skilled in the art would understand, rotation of drill string 301 (as depicted by arrow "A" in FIG. 4) is typically designated as "clockwise" rotation. Accordingly, rotation in the opposite direction is designated as "counter-clockwise." One purpose of the design of the left-handed, counter-clockwise rotational motor of embodiments of the present invention is to allow for, among other things, continuous high speed drilling in the "slide" (non-rotating) mode while rotating drill string 301.

To further explain the function of second motor 203, second motor 203 comprises a rotor 202 and stator 204 designed to rotate rotor 202 in a counter-clockwise direction. In an embodiment where second motor 203 is a conventional mud motor, the rotation speed of second motor rotor 202 is a function of fluid flow rate. In one example, the fluid flow rate is approximately, but not limited to, 250 gpm. In one embodiment, motor 203 is adapted to be a very slow speed, extremely high torque motor. In one example, the rotational speed of second motor rotor 202 may be, but is not limited to, 80 rpm rotating in a counter-clockwise direction.

Lower drilling assembly 100 contains first motor 108, which comprises rotor 106 and stator 107. In an embodiment where first motor 108 is a conventional mud motor, it is adapted to accommodate the same exemplary 250 gpm flow rate. In one example, first motor 108 may be designed to rotate rotor 106 in a clockwise direction at, but not limited to, 180 rpm. First motor rotor 106 is operationally connected to drill bit 101.

To continue this non-limiting example, with second motor rotor 202 rotating in a counter-clockwise direction at 80 rpm, first motor stator 107 experiences this counter-clockwise rotational force. To counteract this rotational force, drill string 301 must rotate continuously at 80 rpm clockwise to neutralize the rotational force provided from second motor 203. With drill string 301 rotating at 80 rpm clockwise, lower drilling assembly 100 is not rotating, i.e., has become geo-stable. This is the same rotational disposition as used in the drilling term slide. Still referring to this example, first motor rotor 106 is continuously rotating clockwise at 180 rpm, but the lower drilling assembly 100 is not rotating. To force the lower drilling assembly 100 into a clockwise rotation mode, the rotation speed of drill string 301 is simply increased. This additional rotation above 80 rpm will rotate the entire downhole drilling assembly 10 in a clockwise direction. The drill bit 101 will rotate at 180 rpm plus the additional drill string rotations required to rotate downhole drilling assembly 10. The additional rotations may be about, but is not limited to, 5 rpm. To force the lower drilling assembly 100 into a counter-clockwise rotation mode, the rotation speed of drill string 301 is simply decreased. This reduction in rotation below 80 rpm will result in rotation of lower drilling assembly 100 in a counter-clockwise direction, while upper drilling assembly 200 continues to rotate in a clockwise direction. The drill bit 101 will rotate at 180 rpm minus the reduced rotation rate below the exemplary 80 rpm. The reduction in rotations may be about, but is not limited to, 5 rpm.

Controlling rotation of downhole drilling assembly 10 while maintaining constant flow rate of the drilling mud allows for control of the entire downhole drilling assembly 10 by merely altering rotational speed of drill string 301.

Figure 7:
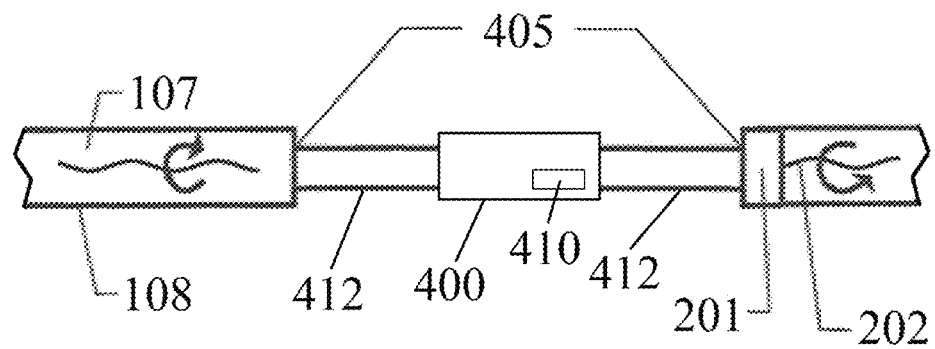
FIG. 7 depicts an embodiment of a logic assembly portion of the present invention.

In one embodiment, logic assembly 405 may comprise an LWD and/or MWD component 410, and/or one or more non-magnetic drill collars 412 which may comprise the metal allow Monel® and are commonly referred to in the industry (whether they comprise Monel® or not) as "Monel collars" or simply "Monels," as shown in FIG. 7. As would be known by one skilled in the art, a Monel 412 may be utilized to shield one or more components from proximate magnetic fields.

In one embodiment, a downhole drilling assembly 10 of the present invention incorporates a clutch joint assembly, referred to herein for convenience only as a Downhole Clutch Joint ("DCJ") 414. In an embodiment shown in FIG. 7A, a DCJ 414 is positioned intermediate the upper drilling assembly 200 bearing assembly 201 and a Monel 412. In one embodiment, a DCJ 414 may be engaged with bearing assembly 201 via screwed connection there between, or by another standard connection method as would be understood by one skilled in the art. Although embodiments of a DCJ 414 of the present invention are disclosed in conjunction with a downhole drilling assembly, such as downhole drilling assembly 10, the invention is not so limited and a DCJ 414 may be employed in any mechanical operation where rotation of component(s) in an undesired direction is problematic. Accordingly, while a DCJ 414 upper component 420 and lower component 446 are referred to herein as "subs," this nomenclature is for convenience only in regard to a description for use of embodiments of a clutch joint assembly of the present invention in conjunction with downhole drilling assemblies, and in other applications such components may be referred to by different names, as would be understood by one skilled in the art. In this aspect, herein the term "sub" refers to any (relatively) small component of a drill string, such as, but not limited to, a short drill collar or thread crossover. In addition, a box end sub generally refers to a sub comprising a female threadform ("box end") attachable to the drill string pipe, and pin end sub generally refers to a sub comprising a male threadform ("pin end") attachable to the drill string pipe.

In one aspect, as explained in detail below, a DCJ 414 may be utilized to prevent the transmission of rotational force to lower drilling assembly 100 in an undesired direction. In one embodiment, the undesired direction of rotation is counter to the rotational direction of the drill string 301 which has a rotational direction designated by arrow "A" in FIG. 4. Thus, in one embodiment, the undesired rotational direction is the direction designated by arrow segment "E" in FIG. 4. Although the embodiments of a DCJ 414 described herein are configured to prevent transmission of rotational force in one direction, the invention is not so limited and may be oppositely configured to prevent transmission of rotational force in the opposite direction.

Figure 7A:
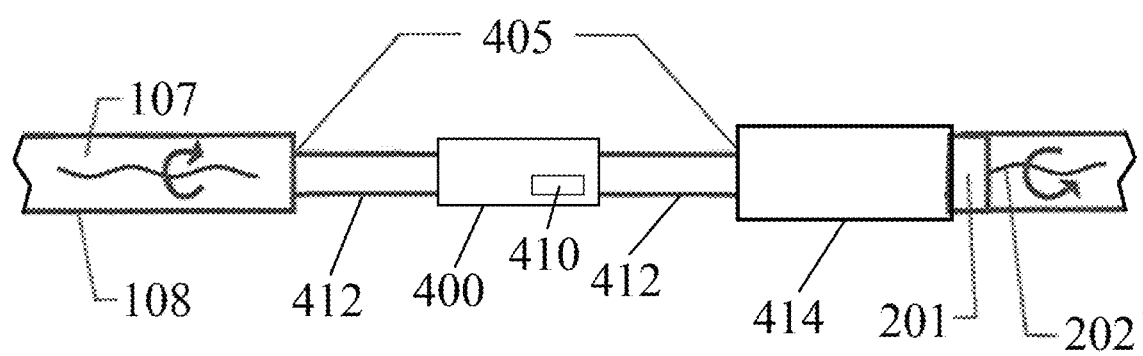
FIG. 7A depicts an embodiment of a portion of a downhole drilling assembly comprising a downhole clutch joint assembly of the present invention.
Figure 8:
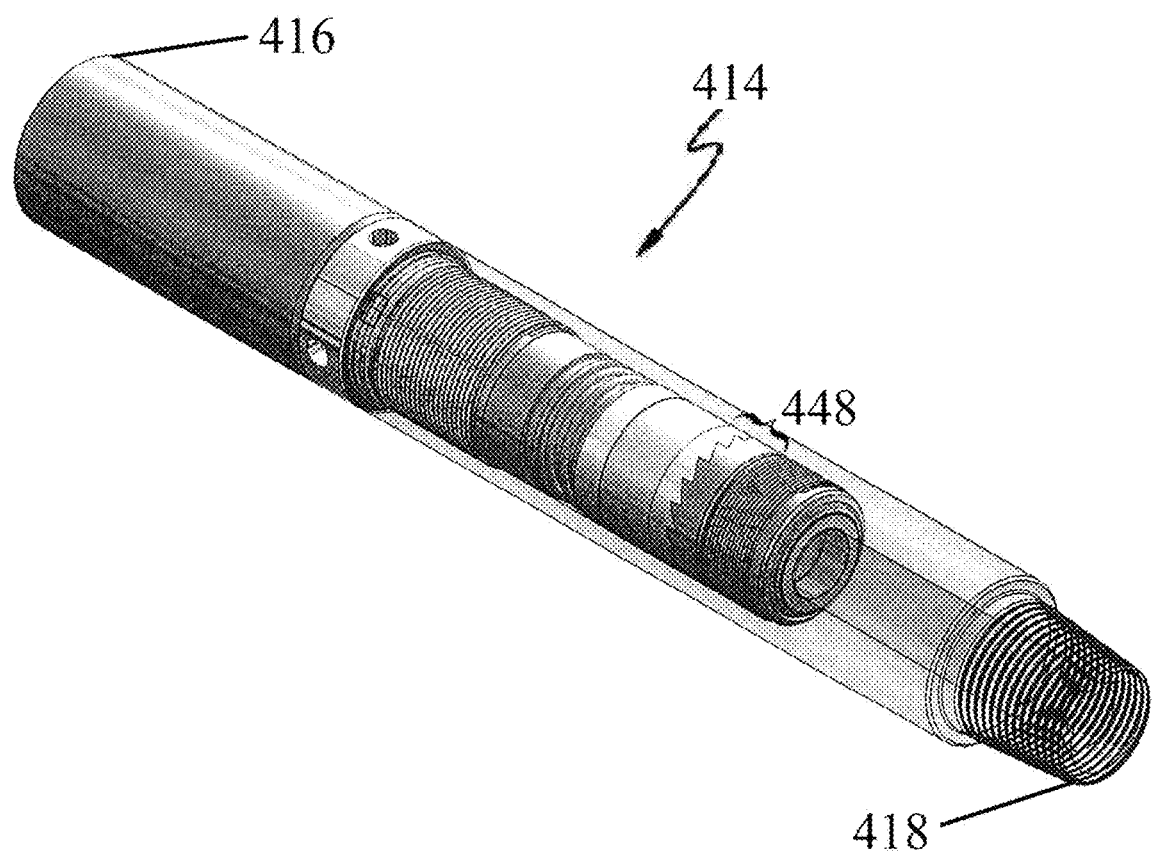
FIG. 8 depicts a partially transparent view of an embodiment of a downhole clutch joint assembly of the present invention.

In an embodiment partially transparently shown in FIG. 8, a DCJ 414 comprises a top end 416 and a bottom end 418. In one embodiment, top end 416 of DCJ 414 is attachable to upper drilling assembly 200 bearing assembly 201 and bottom end 418 is attachable to a Monel 412, as depicted in FIG. 7A, although the invention is not so limited and other orientations and/or configurations are contemplated. As will be explained in detail below, an aspect of the DCJ 414 is a clutch joint mechanism 448.

Figure 9:
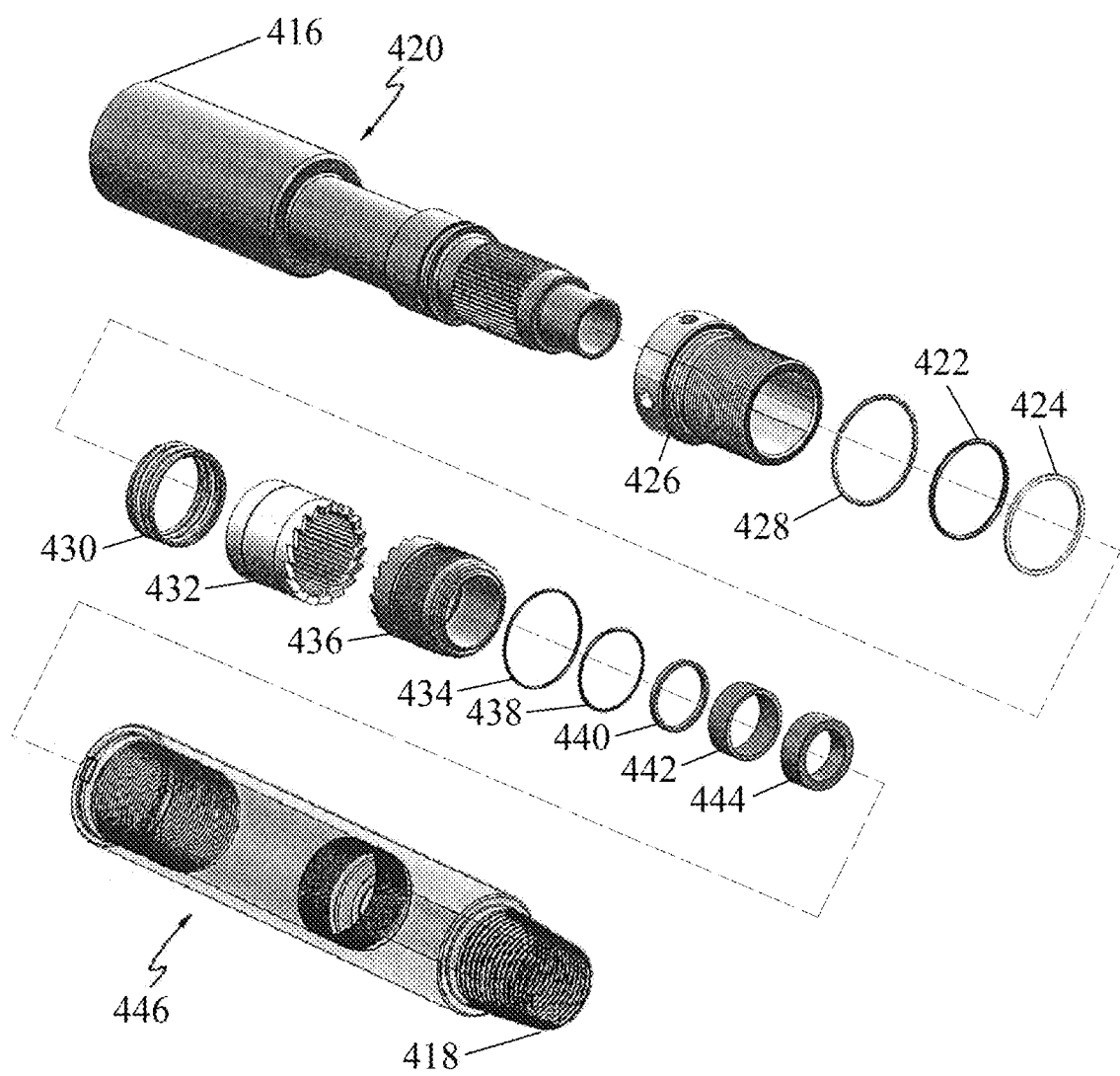
FIG. 9 depicts an exploded view of an embodiment of a downhole clutch joint assembly of the present invention.

Referring now to FIG. 9, an exploded view of an embodiment of a DCJ 414 is depicted. In the embodiment shown in FIG. 9, the DCJ 414 comprises a box end sub 420, a split nut 426, an annular spring device 428, an upper annular seal component 422, a lower annular seal component 424, a biasing member (such as a spring) 430, an upper ratchet sleeve 432 and a lower ratchet sleeve 436 (cooperatively ratchet sleeve assembly 429), an upper seal 434, a lower seal 438, an upper packing retainer 440, a seal element 442, a lower packing retainer 444, and a pin end sub 446. In one embodiment, the above-listed components are cooperatively arranged to provide a DCJ 414.

Figure 10:
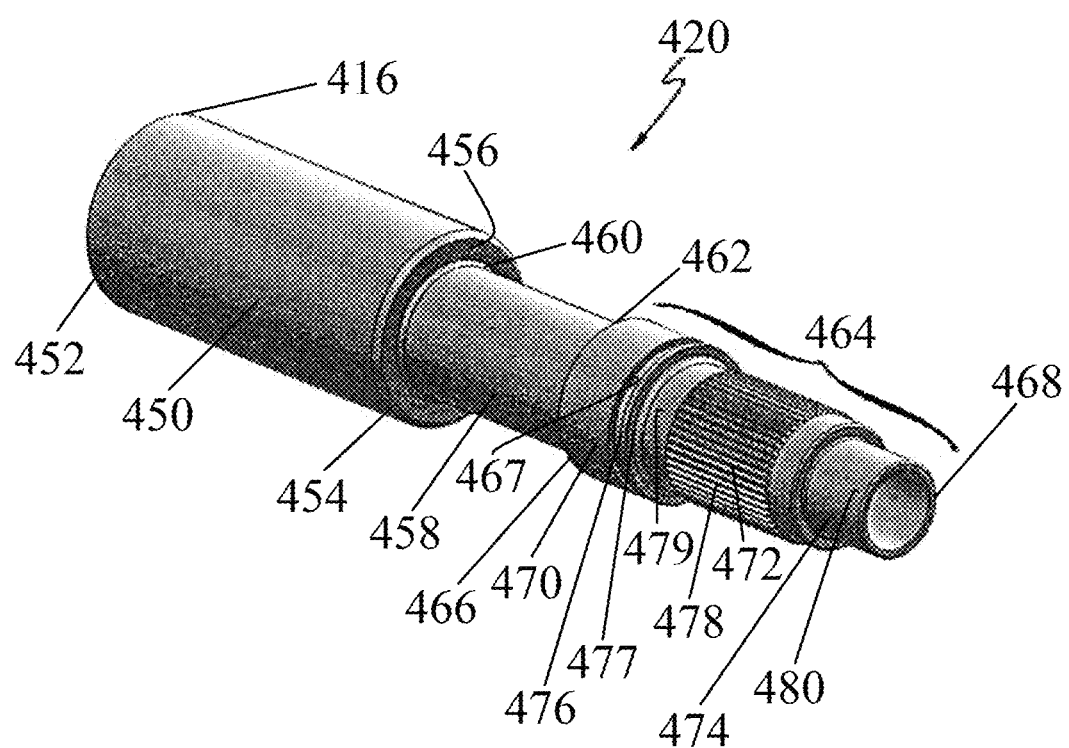
FIG. 10 depicts an embodiment of a box end sub of the present invention.

FIG. 10 shows an embodiment of a box end sub 420. In one embodiment, box end sub 420 is a tubular component comprising a substantially cylindrical top section 450, which comprises an upper end 452 (which constitutes top end 416 of DCJ 414) and a lower end 454. In one embodiment, box end sub 420 may comprise metal, such as, but not limited to, steel or aluminum, and/or a hardened synthetic material such as plastic. In one embodiment, cylindrical top section 450 comprises internal threading (not visible in FIG. 10) that provides for screwed engagement between box end sub 420 and bearing assembly 201 (or other up-hole component), although the invention is not so limited and other connective arrangements and/or connectivity means may be employed, as would be understood by one skilled in the art. In one embodiment, such internal threading of cylindrical top section 450 is an API thread, such as, but not limited to, a 3½ inch internal flush (IF) NC-38 V-0.038R API thread. In one embodiment (not shown), box end sub 420 may be integral with an up-hole (or other rotatable) component.

In one embodiment, box end sub 420 comprises a substantially cylindrical intermediate section 458 that is axially connected to or integral with top section 450, and which comprises an upper end 460 and a lower end 462. In one embodiment, top section 450 has a diameter greater than the diameter of intermediate section 458. In one embodiment, top section 450 comprises a substantially flat bottom end surface 456, although other surface configurations may be employed.

In one embodiment, box end sub 420 comprises a substantially cylindrical bottom section 464 that is axially connected to or integral with intermediate section 458, and which comprises an upper end 466 and a lower end 468. In one embodiment, bottom section 464 comprises, in order of decreasing diameter, a top portion 470, an intermediate portion 472, and a bottom portion 474. In one embodiment, a seal groove 476 is disposed between top portion 470 and intermediate portion 472. In one embodiment, a shoulder 477 is disposed on the bottom side (toward intermediate portion 472) of seal groove 476. In one embodiment, shoulder 477 is not flush with an exterior surface 479 of a portion of bottom cylindrical section 464 intermediate portion 472 disposed between shoulder 477 and external splines 478. In one embodiment, intermediate portion 472 comprises a plurality of external longitudinally oriented splines 478. Bottom portion 474 may comprise an external sealing surface 480.

Still referring to FIG. 10, in one embodiment, upper annular seal component 422 is positionable about intermediate portion 472 of bottom cylinder section 464 of box end sub 420, proximate top portion 470. In one embodiment, lower annular seal component 424 is positionable about intermediate portion 472, proximate upper annular seal component 422. In one embodiment, a seal groove 476 of bottom cylindrical section 464 is provided for provision of one or both of annular seal components 422 and 424 at least partially there within. In one embodiment, upper annular seal component 422 comprises an o-ring comprising a flexible material, such as, but not limited to, a fluoroelastaomer (e.g., Viton®). In one embodiment, lower annular seal component 424 comprises a significantly rigid material, such as, but not limited to, metal or Teflon®.

Figure 11A:
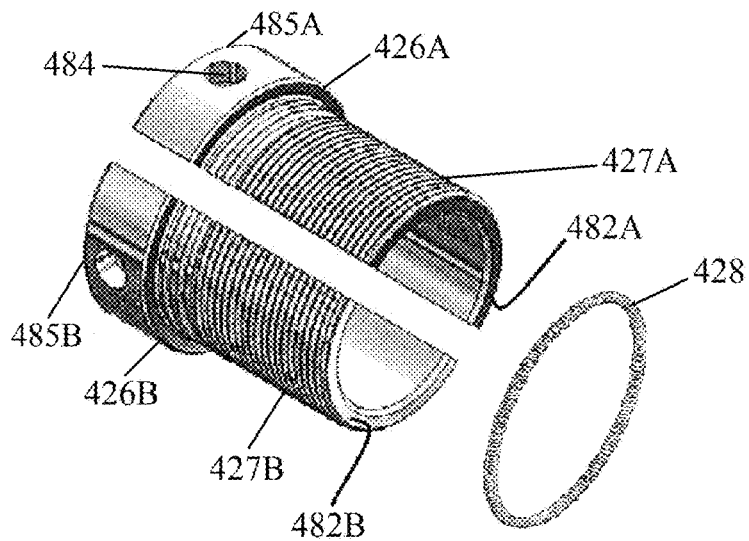
FIG. 11A depicts an embodiment of components of a split nut of the present invention positioned proximate an embodiment of a spring device of the present invention.
Figure 11B:
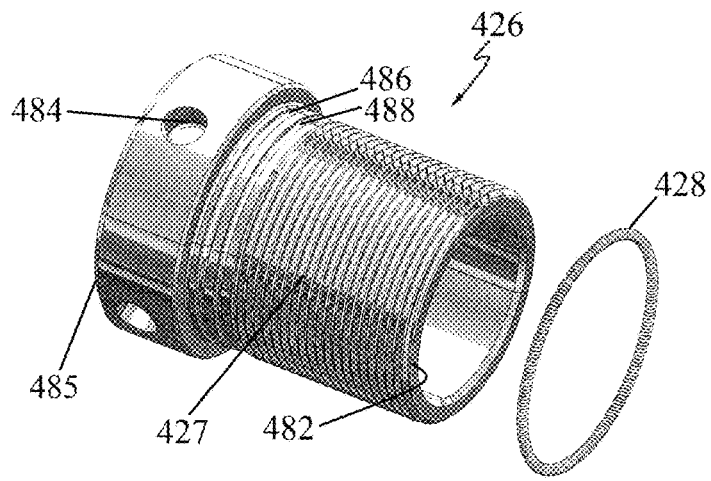
FIG. 11B depicts the split nut components depicted in FIG. 11A cooperatively engaged to form an embodiment of a split nut of the present invention positioned proximate the spring device depicted in FIG. 11A.
Figure 11C:
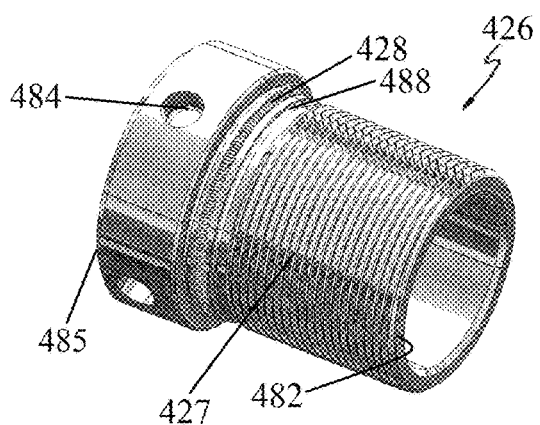
FIG. 11C depicts the split nut depicted in FIG. 11B equipped with the spring device depicted in FIGS. 11A and 11B.

Referring now to FIGS. 11A, 11B, and 11C, in one embodiment, split nut 426 comprises two separate components 426A and 426B. In other embodiments (not shown), split nut 426 may comprise three or more separate components. In one embodiment, split nut components 426A and 426B comprise external threading 427A and 427B, respectively, which collectively constitute external threading 427 about a portion of split nut 426, as shown in FIGS. 11B and 11C. In one embodiment, split nut 426 comprises a right-hand external threading 427. In one embodiment, split nut 426 comprises a top end 485, with split nut components 426A and 426B comprising top ends 485A and 485B, respectively. In one embodiment, split nut components 426A and 426B comprise bottom end surfaces 482A and 482B, respectively, which collectively constitute bottom end surface 482 of split nut 426, as shown in FIGS. 11B and 11C. As depicted FIGS. 11A-C, split nut components 426A and 426B are adapted and configured to be cooperatively engaged to form substantially tubular split nut 426. As shown in the embodiment of FIG. 11B, a split nut 426 may comprise a spring groove 486 into which annular spring device 428 is at least partially positionable, as shown in FIG. 11C. In one embodiment, an annular spring device 428 may comprise a non-circular component, such as, but not limited to, a garter spring, which is manipulatable into an annular orientation. Split nut 426 may further comprise a thread relief groove 488. In one aspect, thread relief groove 488 may serve as a spacing means to prevent stress cracking due to overtightening of pin end sub 446 onto box end sub 420. In one embodiment, one or both split nut components 426A and 426B may comprise one or more orifices 484 that are provided for employment of spanner type tools (e.g., a spanner wrench) in installation and removal of split nut 426 from the pin end sub 446, as would be understood by one skilled in the art.

In one aspect, employing a split nut 426 is advantageous as the component for engaging with the upper end 492 of pin end sub 446, as split nut 426 is adapted and configured to be provided in an arrangement in which it may rotate independently about box end sub 420. As described below, when box end sub 420 is rotated in a counter-clockwise direction, split nut 426 is not concomitantly forced into counter-clockwise rotation. As would be understood by one skilled in the art, in other embodiments (not shown), components fixedly but rotationally freely attached to box end sub may be employed in lieu of a split nut 426.

Figure 12:
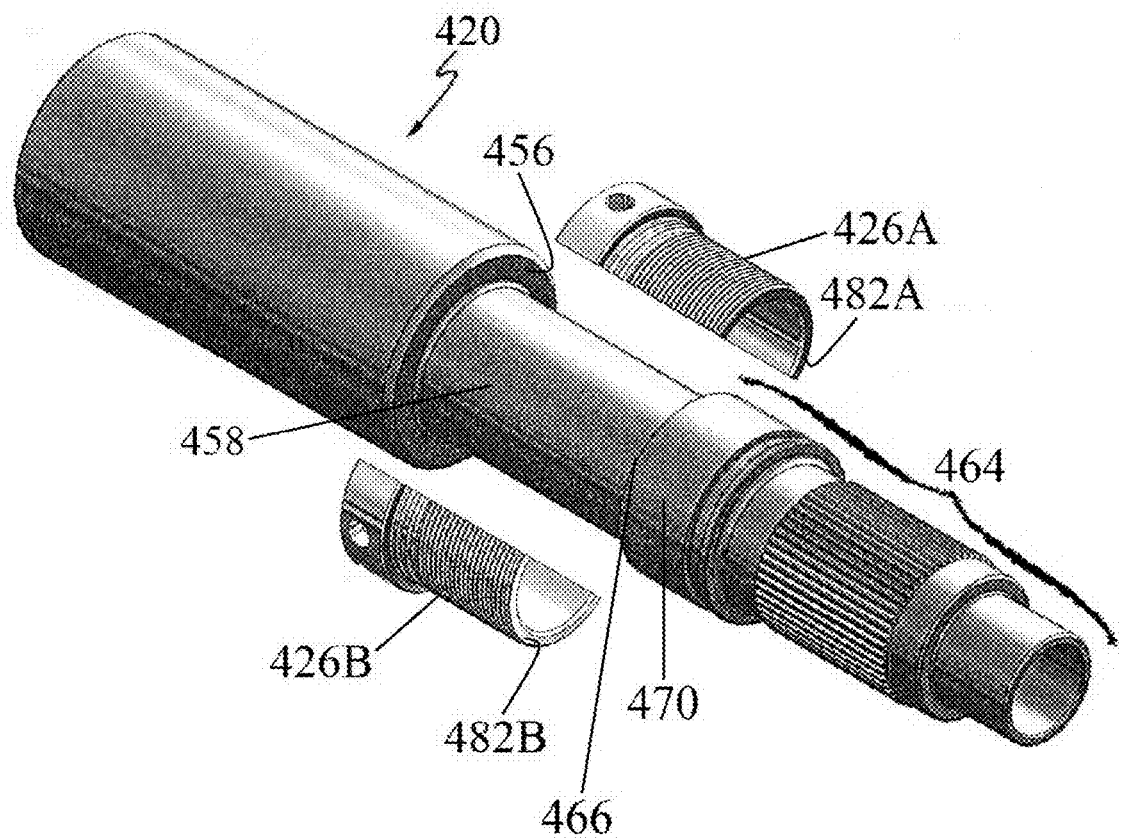
FIG. 12 depicts an embodiment of components of a split nut of the present invention positioned proximate an embodiment of a box end sub of the present invention.

As show in an embodiment depicted in FIG. 12, split nut components 426A and 426B are collectively longitudinally circumferentially postionable about intermediate cylindrical section 458 of box end sub 420, as also observable in FIG. 8. In one embodiment, when so collectively engaged, a top end surfaces of split nut components 426A and 426B (not visible in FIG. 12) at least partially abut bottom end surface 456 of top cylindrical section 450, and/or, bottom end surfaces 482A, 482B of split nut components 426A and 426B, respectively (collectively bottom end surface 482), at least partially abut an upper end surface of bottom cylindrical section 464 top portion 470 upper end 466 (not visible in FIG. 12). In one aspect, once split nut components 426A and 426B are collectively longitudinally circumferentially nonsnugly disposed about intermediate cylindrical section 458 of box end sub 420, annular spring device 428 is provided at least partially within spring groove 486 of split nut 426, similarly to as shown in FIG. 11C, as described below.

Figure 13:
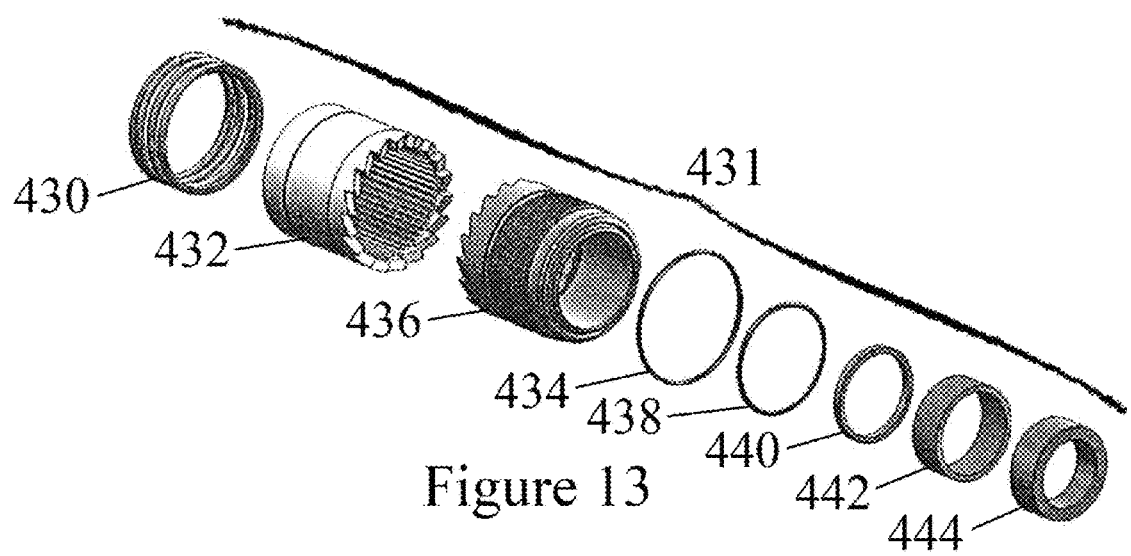
FIG. 13 depicts an exploded view of an embodiment of a ratchet sleeve system of the present invention.

Referring now to FIG. 13, a ratchet sleeve system 431 of the present invention is shown. In one embodiment thereof, biasing member 430 is adapted and configured to be positioned circumferentially about intermediate portion 472 of bottom cylindrical section 464 of box end sub 420, above external splines 478. In one embodiment, biasing member 430 comprises a compression (coil) spring member, although the invention is not so limited and other compressible components may be employed. In one embodiment, spring member 430 comprises a top surface (not visible in FIG. 13) adapted and configured to abut a bottom face 467 of a circumferentially protruding top portion 470 of box end sub 420 bottom cylindrical section 464.

Figure 13A:
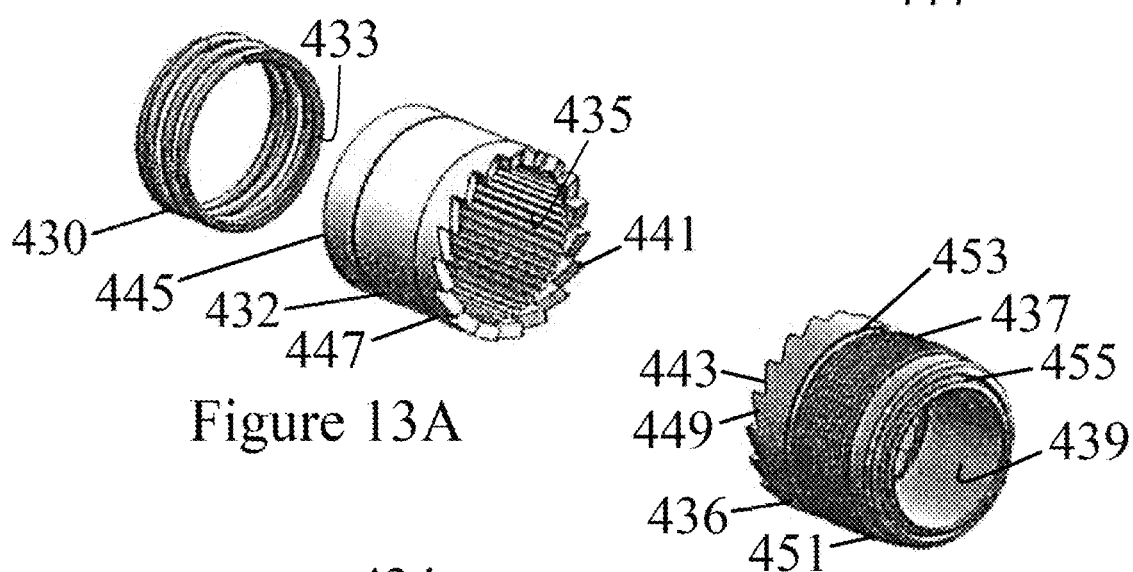
FIG. 13A depicts the upper ratchet sleeve depicted in FIG. 13 positioned proximate the spring member depicted in FIG. 13.

Referring now to FIG. 13A, in one embodiment, upper ratchet sleeve 432 comprises a substantially tubular component comprising an upper end 445 and a lower end 447. In one embodiment, upper ratchet sleeve 432 comprises a plurality of internal splined teeth 435 disposed longitudinally there within. In one aspect, internal splined teeth 435 may be adapted and configured to cooperatively engage external splines 478 when upper ratchet sleeve 432 is circumferentially disposed about intermediate portion 472 of bottom cylindrical section 464 of box end sub 420, as described below. In one embodiment, bottom surface 433 of spring member 430 is adapted and configured to abut a top surface 423 of upper ratchet sleeve 432 (See FIG. 14). In one embodiment, spring member 430 is adapted and configured to bias upper ratchet sleeve 432 against lower ratchet sleeve 436, as further described herein. In one embodiment, upper ratchet sleeve 432 comprises a plurality of saw teeth 441 proximate lower end 447 thereof. In one embodiment, each saw teeth 441 comprises an apex gently sloping downward on one side and steeply sloping downward on the other, as would be understood by one skilled in the art.

Figure 13B:
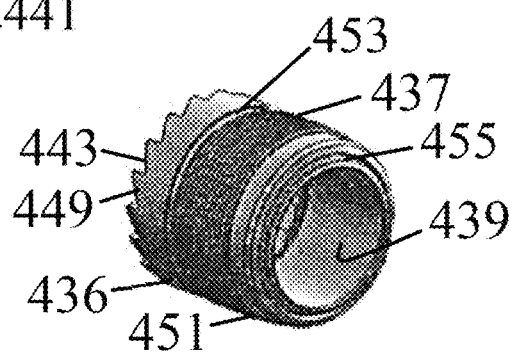
FIG. 13B depicts lower ratchet sleeve depicted in FIG. 13

Referring now to FIG. 13B, in one embodiment lower ratchet sleeve 436 comprises a substantially tubular component comprising an upper end 449 and a lower end 451. In one embodiment, lower ratchet sleeve 436 comprises a plurality of saw teeth 443 proximate upper end 449 thereof. In one embodiment, each saw teeth 443 comprises an apex gently sloping upward on one side and steeply sloping upward on the other, as would be understood by one skilled in the art. In one embodiment, lower ratchet sleeve 436 comprises an inner sealing surface 439 circumferentially disposed within a portion thereof.

Figure 13C:
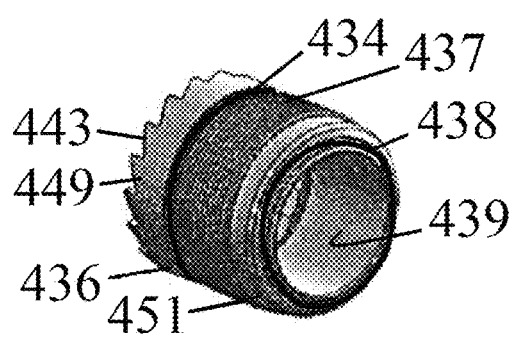
FIG. 13C depicts lower ratchet sleeve depicted in FIG. 13 equipped with upper and lower seals depicted in FIG. 13.

In one embodiment, lower ratchet sleeve 436 comprises an upper seal groove 453 disposed externally circumferentially there around, and/or a lower seal groove 455 disposed externally circumferentially there around. In one embodiment upper seal groove 453 is adapted and configured such that an upper seal 434 may be seated at least partially there within, and/or lower seal groove 455 is adapted and configured such that a lower seal 438 may be seated at least partially there within, as depicted in FIG. 13C.

In one embodiment, lower ratchet sleeve 436 comprises external threading 437 circumferentially there around intermediate upper seal groove 453 and lower seal groove 455. In one embodiment, external threading 437 is adapted and configured to provide screwed engagement between lower ratchet sleeve 436 and pin end sub 446 via internal threading 496 thereof (see FIG. 15), as discussed below. In one embodiment, lower ratchet sleeve 436 may comprise a torquing fitting 425, such as, but not limited to, a hexagonally shaped aperture, disposed there within (partially visible in FIG. 14) that is employable to facilitate tightening of lower ratchet sleeve 436 into pin end sub 446. In one embodiment, lower ratchet sleeve 436 is provided with a material, such as, but not limited to, Loctite®, available from Henkel Corporation of Düsseldorf, Germany, to help assure proper positioning within into pin end sub 446.

Referring again to FIG. 13, in one embodiment one or more annular seal elements 442 are provided, wherein the seal element(s) 442 are positionable within the lower end 451 of lower ratchet sleeve 436. In one embodiment, a seal element 442 may comprise metal, such as, but not limited to, an aluminum-nickel-bronze alloy, and/or a synthetic material such as plastic. In one embodiment (not shown), a seal element 442 may comprise a plurality of components combined to provide an annular seal element 442. In one aspect, so positioned seal element(s) 442 provide a fluidly sealed connection between the interior of box end sub 420 (via sealing surface 480 of bottom portion 474 of bottom cylindrical section 464) and inner sealing surface 439 of lower ratchet sleeve 436. In one embodiment, annular upper packing retainer 440 and annular lower packing retainer 444 are positioned above and below seal element(s) 442, respectively, within the interior of lower ratchet sleeve 436, to maintain seal element(s) 442 in proper position during operation, as discussed below.

Figure 14:
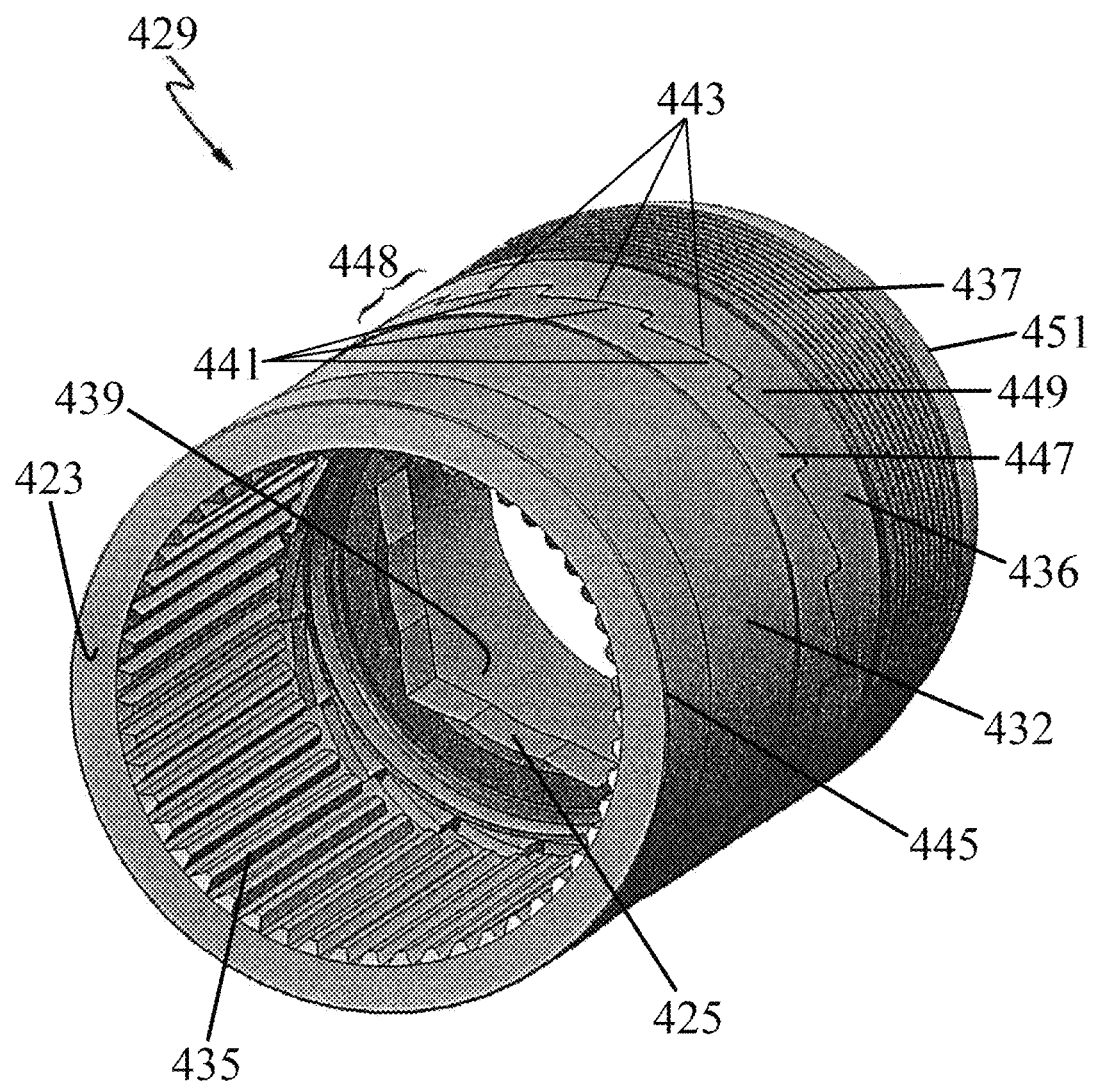
FIG. 14 depicts an embodiment of a ratchet sleeve assembly of the present invention.

Referring now to FIG. 14, in one embodiment, upper ratchet sleeve 432 and lower ratchet sleeve 436 may be longitudinally aligned, with upper ratchet sleeve 432 lower end 447 abutting lower ratchet sleeve 436 upper end 449, to provide ratchet sleeve assembly 429. In one aspect, such positioning provides engagement of upper ratchet sleeve 432 saw teeth 441 with lower ratchet sleeve 436 saw teeth 443. In one embodiment, saw teeth 441 and saw teeth 443 are adapted and configured to be fittingly engaged to provide clutch joint mechanism 448, as described in more detail below.

Figure 15:
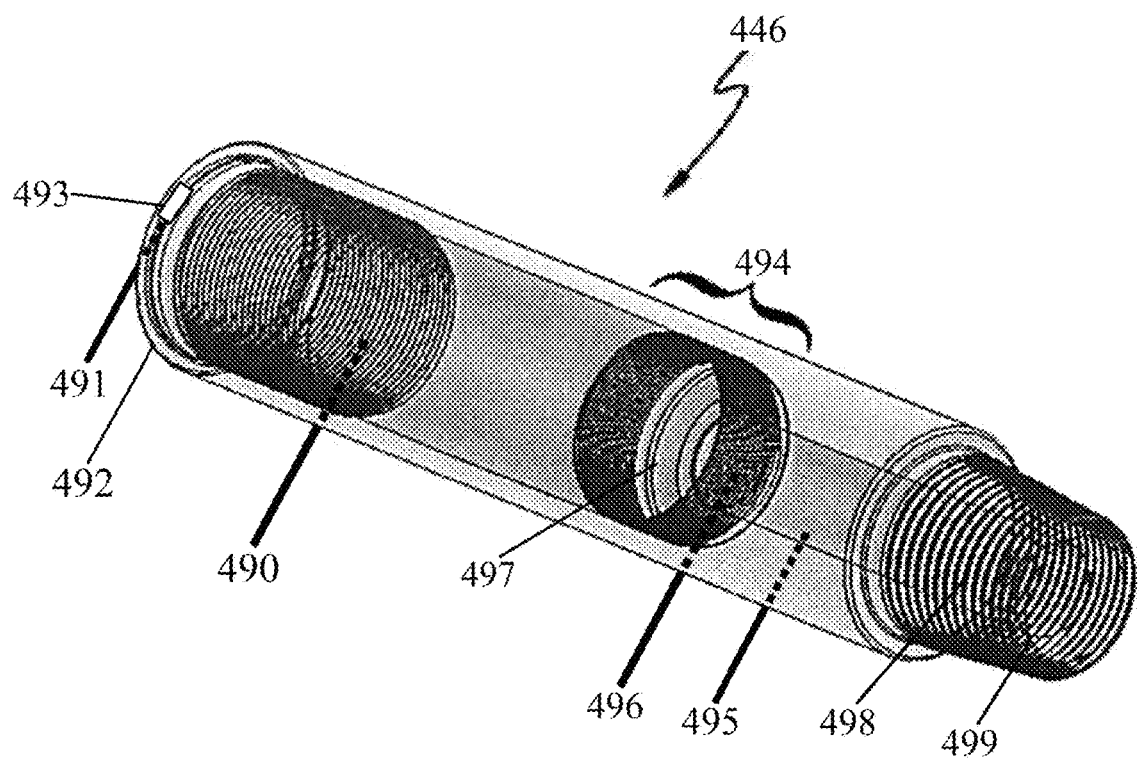
FIG. 15 depicts a partially transparent view of an embodiment of a pin end sub of the present invention.
Figure 16:
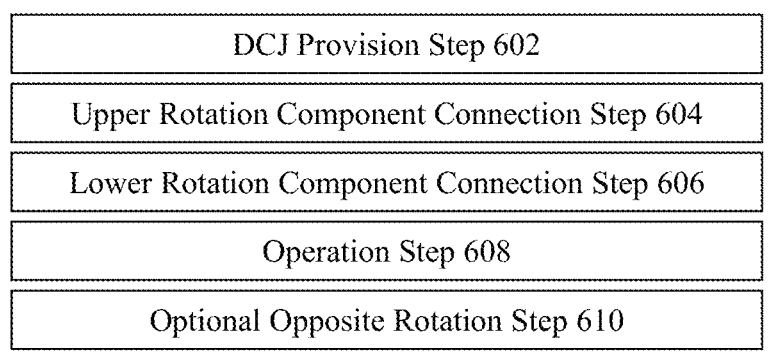
FIG. 16 depicts an embodiment of a method of the present invention.

An embodiment of a pin end sub 446 of the present invention is depicted in FIG. 15. In the embodiment shown in FIG. 15, pin end sub 446 comprises a substantially cylindrical component comprising an upper end 492, and a lower end 499 (which constitutes bottom end 418 of DCJ 414). In one embodiment, pin end sub 446 comprises internal threading 490 proximate upper end 492 thereof. Internal threading 490 may be adapted and configured to provide screwed engagement between pin end sub 446 and box end sub 420 via external threading 427 of split nut 426, as discussed below. In one embodiment, pin end sub 446 comprises an internal spring groove 491. In one aspect, spring groove 491 is adapted and configured to cooperate with split nut 426 spring groove 486 to accommodate annular spring device 428, which may be provided there within via an orifice 493, as discussed below.

In one embodiment, pin end sub 446 comprises internal threading 496 within an intermediate section 494 thereof. Internal threading 496 may be adapted and configured to provide screwed engagement between pin end sub 446 and lower ratchet sleeve 436 via external threading 437 thereof, as discussed below. In one embodiment, intermediate section 494 of pin end sub 446 comprises an internal shoulder 497 proximate a lower end of internal threading 496. In one embodiment, pin end sub 446 comprises an internal tubular member 495 disposed intermediate lower end 499 and internal threading 496. In one aspect, intermediate section 494 of pin end sub 446 may be adapted and configured such that tubular member 495 is sealingly fluidly connectable to the interior of lower ratchet sleeve 436, via the interiors of upper packing retainer 440, seal element 442 and lower packing retainer 444, wherein an exterior surface of seal element 442 (not separately labeled) sealingly abuts inner sealing surface 439 of lower ratchet sleeve 436.

In one embodiment, pin end sub 446 comprises external threading 498 proximate lower end 499 thereof. In one aspect, external threading 498 may be adapted and configured to provide screwed engagement between pin end sub 446 (and therefore DCJ 414) and a Monel 412 (or other downhole component), although the invention is not so limited and other connective arrangements and/or connectivity means may be employed, as would be understood by one skilled in the art. In one embodiment, external threading 498 comprises an API male thread. In one embodiment (not shown), pin end sub 446 may be integral with a downhole (or other rotatable) component.

Assembly

In one embodiment, a DCJ 414 may be assembled as follows:

A lower ratchet sleeve 436 is provided. An upper packing retainer 440 is annularly inserted within lower ratchet sleeve 436 from lower end 451 thereof. A seal element 442 is then similarly annularly fittingly inserted within lower ratchet sleeve 436, whereupon a lower packing retainer 444 is similarly annularly inserted into lower ratchet sleeve 436. In one aspect, the exterior surface of seal element 442 (not separately labeled) is in contact with inner sealing surface 439 of lower ratchet sleeve 436;

Further, a lower seal 438 is circumferentially seated in lower seal groove 455 of lower ratchet sleeve 436 and an upper seal 434 is circumferentially seated in upper seal groove 453 of lower ratchet sleeve 436;

The lower ratchet sleeve 436, so equipped, is provided proximate upper end 492 of a pin end sub 446, and inserted into the pin end sub 446 (from upper end 492) such that lower end 451 of lower ratchet sleeve 436 is disposed toward lower end 499 of pin end sub 446 and upper end 449 of lower ratchet sleeve 436 is disposed toward upper end 492 of pin end sub 446. In one aspect, a tool adapted and configured to engage a torquing fitting 425 of lower ratchet sleeve 436 is utilized to ensure secure positioning of lower ratchet sleeve 436 within pin end sub 446 via screwed engagement of external threading 437 of lower ratchet sleeve 436 with internal threading 496 of pin end sub 446, as would be understood by one skilled in the art. In one aspect, such secured positioning of lower ratchet sleeve 436 within pin end sub 446 provides lower packing retainer 444 in biased contact with internal shoulder 497 of intermediate section 494 of pin end sub 446, whereby upper packing retainer 440, seal element 442, and lower packing retainer 444 are securely confined against each other within lower ratchet sleeve 436;

Separately, a box end sub 420 is provided. An upper annular seal component 422 is provided proximate lower end 468 of the box end sub 420, and the upper annular seal component 422 is circumferentially advanced about bottom cylindrical section 464 of the box end sub 420 until the upper annular seal component 422 is seated in seal groove 476 thereof. A lower annular seal component 424 is then circumferentially advanced about bottom cylindrical section 464 of the box end sub 420 until the lower annular seal component 424 is also seated in seal groove 476 thereof. In one aspect, the thus installed upper annular seal component 422 and lower annular seal component 424 are relatively disposed such that the upper annular seal component 422 is positioned closer to upper end 466 of bottom cylindrical section 464 and the lower annular seal component 424 is positioned closer to lower end 468 of bottom cylindrical section 464;

Further, a spring member 430 is then provided proximate lower end 468 of thus equipped box end sub 420. The spring member 430 is circumferentially advanced about bottom cylindrical section 464 of the box end sub 420 until the spring member 430 is positioned in abutment with shoulder 477;

An upper ratchet sleeve 432 is then provided proximate lower end 468 of the thus equipped box end sub 420. The upper ratchet sleeve 432 is circumferentially advanced along bottom cylindrical section 464 of the box end sub 420 (with internally splined teeth 435 cooperatively engaged with external splines 478 of bottom section 464) until upper end 445 of the upper ratchet sleeve 432 abuts bottom surface 433 of spring member 430;

A split nut 426 is then provided. The split nut 426 is separated into individual components 426A and 426B, and oppositely positioned proximate intermediate cylindrical section 458 of box end sub 420, with top ends 485A and 485B disposed proximate upper end 460 thereof and bottom end surfaces 482A and 482B proximate lower end 462 thereof (See FIG. 12). In this configuration, split nut 426A external threading 427A and split nut 426B external threading 427B are aligned to provide substantially continuous threading 427 suitable for screwed engagement thereabout;

The box end sub 420, as so equipped, is fitted into the so equipped pin end sub 446, via insertion of lower end 468 (of box end sub 420) into upper end 492 (of pin end sub 44). The so positioned box end sub 420 and pin end sub 446 are securely attached together via screwed engagement of split nut 426 external threading 427 with pin end sub 420 internal threading 490. In one aspect, tightening of this screwed engagement may be performed with a tool, such as a spanner wrench, utilizing one or more orifices 484, as would be understood by one skilled in the art; and The thus substantially constructed DCJ 414 is then provided. In one embodiment, a garter spring 428 is provided proximate upper end 492 of pin end sub 446. In one embodiment, the garter spring 428 is provided in a substantially linear configuration and inserted into DCJ 414 via orifice 493, wherein the garter spring 428 is forced into an annular orientation such that at least a portion of the thus created annular spring device 428 is disposed at least partially within spring groove 491 of upper end 492 of pin end sub 446, and partially within spring groove 486 of split nut 426. In one aspect, the annular spring device 428 prevents any undesired loosening (counter-clockwise rotation) of split nut 426 from pin end sub 446. In one aspect, annular spring device 428 acts as a continuous circumferential shear pin, helping assure that split nut 426 cannot be accidentally disengaged from pin end sub 446. In one embodiment, a material, such as Loctite®, may be applied around and/or proximate the so installed annular spring device 428 and/or orifice 493 to fluidly seal the DCJ 414.

In one embodiment, the internal portion of DCJ 414 comprising the spline mechanism (external splines 478 and internally splined teeth 435), clutch joint mechanism 448, and spring member 430 is fluidly sealed from the environment, especially drilling fluids used in downhole drilling operations. In one aspect, the upper end of this portion of DCJ 414 is fluidly sealed by annular seal components 422 and 424, wherein these components cooperate to form a fluid seal between seal groove 476 and a polished internal bore of pin end sub 446. In one aspect, the lower end of this portion of DCJ 414 is redundantly fluidly sealed by lower seal 438 (seated in lower seal groove 455 of lower ratchet sleeve 436) and upper seal 434 (seated in upper seal groove 453 of lower ratchet sleeve 436), wherein these components each operate to form a fluid seal with the internal bore of pin end sub 446 (not separately labeled). In one aspect, fluid sealing of DCJ 414 is further provided by cooperation of sealing surface 480 (of bottom portion 474 of bottom cylindrical section 464 of box end sub 420) and an interior surface of seal element 442 (not separately labeled). In one aspect, a DCJ 414 provides a clutch joint mechanism that may be lubricated, as would be understood by one skilled in the art. In one aspect, a DCJ 414 provides a clutch joint mechanism in a fluidly sealed arrangement; i.e., wherein drilling fluids within the wellbore, and particulates disposed there within (such as lost circulation materials (LCM)) are prevented from coming into contact therewith.

The assembly embodiment described above is merely exemplary. In other embodiments, the components may be combined and/or interconnected in different ways or order, and other components performing similar functions may be substituted therefor or added thereto, as would be understood by one skilled in the art.

Method

In one embodiment of the present invention, downhole drilling assembly 10 is attached to the end of drill string 301 and lowered into the wellbore (not shown). Mud flow and rotational force are supplied thereto to commence rotation of the upper drilling assembly 200 and lower drilling assembly 100. In one embodiment, sensor information is transmitted from sensor transmission unit 104 to electronic module 408; from electronic module 408 to pulser 406; and from pulser 406 to the surface, each of which transmissions may be carried out on a substantially continuous basis. The information received at the surface is utilized, as received or as subsequently processed, compiled, analyzed, and/or otherwise manipulated, to determine desired operating and drilling parameters. If warranted, the ratio of forces (drill string 301 rotation and mud flow rate) applied to the upper drilling assembly 200 and lower drilling assembly 100 may be changed to control downhole drilling assembly 10. In one embodiment, this ratio of forces is varied by changing the drill string 301 rotation rate only.

An exemplary method 500 of the present invention comprises the following steps:

Provision Step 502—Providing a downhole drilling assembly, such as downhole drilling assembly 10, comprising a lower drilling assembly, such as lower drilling assembly 100, an upper drilling assembly, such as upper drilling assembly 200, and a drill bit, such as drill bit 101.

Connection Step 504—Connecting a stator of a motor of the upper drilling assembly, such as stator 204, to the end of a drill string, such as drill string 301.

Operation Step 506—Operating the downhole drilling assembly 10 down hole, whereby:

rotation of the drill string 301 in a clockwise direction results in rotation of a stator of a motor of the upper drilling assembly, such as stator 204, in a clockwise direction;

flow of mud down hole results in rotation of a rotor of the motor of the upper drilling assembly, such as rotor 202, in a counter-clockwise direction;

flow of mud down hole results in rotation of a rotor of a motor of the lower drilling assembly, such as rotor 106, in a clockwise direction;

rotation of rotor 106 in a clockwise direction results in, via a bearing assembly of the lower drilling assembly, such as bearing assembly 105, rotation of drill bit 101 in a clockwise direction;

rotation of stator 204 in a clockwise direction results in a clockwise rotational force being applied, via frictional force, to a stator of the motor of the lower drilling assembly, such as stator 107; and rotation of rotor 202 in a counter-clockwise direction results in, via attachment thereof to stator 107, via a bearing assembly of the upper drilling assembly, such as bearing assembly 201, a counter-clockwise rotational force being applied to stator 107.

Optional Slide Operation Step 508—Continuously or intermittently rotating the drill string 301 at a rate and flowing mud down hole at a rate whereby the clockwise force applied to stator 107 and the counter-clockwise force applied to stator 107 are equal, and thereby downhole assembly 100 does not rotate.

Optional Opposite Rotation Operation Step 510—Continuously or intermittently rotating the drill string 301 at a rate and flowing mud down hole at a rate whereby the clockwise force applied to stator 107 is less than the counter-clockwise force applied to stator 107, and thereby downhole assembly 100 rotates in a counter-clockwise direction.

Optional Control Operation Step 512—Continuously or intermittently controlling the downhole drilling assembly 10 utilizing information obtained, continuously or intermittently, from sensors in a drilling sensor assembly, such as drilling sensor assembly 103, and transmitted continuously or intermittently, to a processing device, such as processing device 302, located at or near the surface of the well, whereby controlling the downhole drilling assembly 10 consists of adjusting drilling parameters at the surface of the well without having to send any signals down hole.

Method 500 is merely exemplary, and additional embodiments of a method of utilizing a downhole drilling assembly of the present invention consistent with the teachings herein may be employed.

Operation

In one embodiment of the present invention, a downhole drilling assembly 10, comprising a DCJ 414 (as exemplarily depicted in FIG. 7A), is attached to the end of drill string 301 and lowered into the wellbore (not shown). Rotational force is supplied thereto to commence rotation of the upper drilling assembly 200 and lower drilling assembly 100. In one embodiment, such rotational force may be provided via rotary table, top drive, and/or mud motor. In one embodiment, such rotational force causes external splines 478 of box end sub 420 bottom cylindrical section 464 intermediate portion 472 to engage internally splined teeth 435 of upper ratchet sleeve 432 and concomitantly rotate upper ratchet sleeve 432 accordingly. In one embodiment, rotation of upper ratchet sleeve 432, which is allowed to move up and down on cylindrical section 464 intermediate portion 472 via a sliding fit of internally splined teeth 435 and external splines 478, induces rotation of lower ratchet sleeve 436, and therefore pin end sub 446 (and any components attached thereto). In one aspect, such induced rotation of lower ratchet sleeve 436 is accomplished via clutch joint mechanism 448, as described below.

In one aspect, when the rotation of the drill string 301 is in a clockwise direction (as depicted by arrow "A" in FIG. 4), the downhole drilling assembly 10 operates as described above in exemplary Method 500. During such operation, the application of clockwise rotational force to upper drilling assembly 200 actuates clutch joint mechanism 448, via the interaction of saw teeth 441 (of upper ratchet sleeve 432) and saw teeth 443 (of lower ratchet sleeve 436), to provide clockwise rotational force to lower drilling assembly 100.

In one embodiment, when employing the downhole drilling assembly 10 comprising a DCJ 414, if the drill string 301 is rotated in a counter-clockwise direction, the DCJ 414 operates to prevent counter-clockwise rotation of the lower drilling assembly 100, via clutch joint mechanism 448. In one aspect, when drill string 301 is rotated in a counter-clockwise direction, box end sub 420 (and therefore upper ratchet sleeve 432 which is engaged with external splines 478) rotate in a counter-clockwise direction. During such counter-clockwise rotational movement of upper ratchet sleeve 432, the interaction between saw teeth 441 (of upper ratchet sleeve 432) and saw teeth 443 (of lower ratchet sleeve 436) does not provide significant rotational force to lower ratchet sleeve 436. In addition, during counter-clockwise rotation of box end sub 420, split nut 426 (and therefore pin end sub 446 with which it is in screwed engagement) can remain rotationally stable; i.e., these components are not forced into counter-clockwise rotation by the such rotation of box end sub 420. In one aspect, this interaction between saw teeth 441 and saw teeth 443 results in teeth slippage and upward movement of upper ratchet sleeve 432 in relation to lower ratchet sleeve 436. Continued counter-clockwise rotational movement of upper ratchet sleeve 432 results in upper ratchet sleeve 432 rising and falling in relation to lower ratchet sleeve 436 in a "clack" "clack" "clack" sounding uncooperative interaction. Thus, while upper ratchet sleeve 432 is rotating counter-clockwise, lower ratchet 436 (and therefore pin end sub 446 and any components attached downhole thereto) are substantially non-rotating. In one aspect, the amount of counter-clockwise torque required to disengage saw teeth 441 from saw teeth 443 is dictated by the ramp angle of the saw teeth 441, 443, and the compression strength (spring rate) of spring member 430.

In one aspect, such prevention of counter-clockwise rotational force to lower drilling assembly 100 by upper drilling assembly 200 is useful in that screwed engagement there between (in a downhole drilling assembly 10) is typically "right handed;" i.e., counter-clockwise rotation of upper drilling assembly 200 (accompanied by any resistance of lower drilling assembly 100 to counter-clockwise rotation) can result in undesired disengagement of lower drilling assembly 100 from upper drilling assembly 200. Such disengagement can lead to loss of the lower drilling assembly 100 (and any components attached thereto) downhole.

The operational embodiment described above is merely exemplary. In another embodiment, for example, saw teeth 441 and saw teeth 443 may be oppositely oriented, such that rotation of upper drilling assembly 200 in a counter-clockwise direction would constitute a drilling configuration and clockwise rotation of upper drilling assembly 200 would actuate clutch joint mechanism 448 to prevent clockwise rotational force being applied to lower drilling assembly 100 by upper drilling assembly 200, as would be understood by one skilled in the art. In addition, a DCJ 414 may be employed in any downhole application (whether utilizing a downhole drilling assembly 10 or other downhole drilling assembly) wherein it is desirable to prevent interconnected components from transmitting force in an undesired direction.

In one embodiment, during normal operation (clockwise drill string rotation) of a downhole drilling assembly 10 comprising a DCJ 414, all seals are static; however, when counter-clockwise drill string rotation occurs, annular seal components 422 and 424, as well as seal element 442, become dynamic rotary seals; i.e., provide a sealing function when rotation is counter-clockwise.

In one aspect, the tubular components of DCJ 414 provide relatively sizable means for allowing fluids to be flowed through DCJ 414. Such fluid flow through DCJ 414 can allow for sufficient fluid flow to equipment, such as, but not limited to, mud motors and drilling bits, below DCJ 414. The tubular nature of DCJ 414 further allows for the running of downhole tools there through.

Method

An exemplary method 600 of the present invention comprises the following steps:

DCJ Provision Step 602—Providing a downhole clutch joint, such as DCJ 414, comprising a box end sub, such as box end sub 420, a pin end sub, such as pin end sub 446, and a clutch joint mechanism, such as clutch join mechanism 448.

Upper Rotation Component Connection Step 604—Connecting an upper rotation component, such as an upper drilling assembly 200 or any rotatable component, to the top end of the box end sub of the DCJ.

Lower Rotation Component Connection Step 606—Connecting an upper rotation component, such as an upper drilling assembly 200 or any rotatable component, to the bottom end of the pin end sub of the DCJ.

Operation Step 608—Operating the assembly comprising the upper rotation component, the DCJ, and the lower rotation component, by rotating the upper rotation component in a first direction, whereby the lower rotation component, via the clutch joint mechanism, is rotated in the first direction.

Optional Opposite Rotation Step 610—Operating the assembly comprising the upper rotation component, the DCJ, and the lower rotation component, by rotating the upper rotation component in a second (opposite) direction, whereby the clutch joint mechanism operates to prevent the lower rotation component from rotating in the second direction.

As would be understood by one skilled in the art, method 600 is only exemplary, and may be modified to accomplish specific results, such modifications including, but not limited to, combining, adding, deleting, re-ordering, and/or repeating one or more steps. As would also be understood by one skilled in the art, while method 600 has been described as a plurality of steps, in various embodiments, two or more steps may be performed concurrently.

While the preferred embodiments of the invention have been described and illustrated, modifications thereof can be made by one skilled in the art without departing from the teachings of the invention. Descriptions of embodiments are exemplary and not limiting. The extent and scope of the invention is set forth in the appended claims and is intended to extend to equivalents thereof. The claims are incorporated into the specification. Disclosure of existing patents, publications, and known art are incorporated herein by reference to the extent required to provide details and understanding of the disclosure herein set forth.

I claim:

1. A downhole clutch joint assembly comprising:
   a first component;
   a second component;
   a ratchet sleeve assembly;
   and a biasing member;
   wherein said first component, said second component, said ratchet sleeve assembly, and said biasing member are combined to provide said down hole clutch joint assembly;
   wherein:
   said ratchet sleeve assembly comprises:
   a substantially tubular first ratchet sleeve comprising a plurality of saw teeth proximate a first end thereof; and
   a substantially tubular second ratchet sleeve comprising a plurality of saw teeth proximate an end thereof;
   said first ratchet sleeve is positioned around, and engaged with, a portion of said first component;
   said second ratchet sleeve is positioned within, and engaged with, a portion of said second component;
   said first ratchet sleeve saw teeth are disposed in engaging abutment with said second ratchet sleeve saw teeth;
   said first ratchet sleeve is positioned longitudinally between said biasing member and said second ratchet sleeve;
   said biasing member biases said first ratchet sleeve against said second ratchet sleeve;
   upon rotation of said first component in a first direction, said first ratchet sleeve saw teeth engage said second ratchet sleeve saw teeth to induce rotation of said second ratchet sleeve, and thereby said second component, in said first direction; and
   upon rotation of said first component in a second direction, said first ratchet sleeve saw teeth slidingly disengage from said second ratchet sleeve saw teeth and said second component substantially ceases rotation.

2. The downhole clutch joint assembly of claim 1, wherein said ratchet sleeve assembly and said biasing member are provided in a fluidly sealed environment in relation to an exterior of said clutch joint assembly.

3. The downhole clutch joint assembly of claim 1, wherein said biasing member is a spring.

4. The downhole clutch joint assembly of claim 1, comprising a split nut;
   wherein:
   said split nut comprises a plurality of components cooperatively longitudinally arrangeable to form a substantially tubular structure around at least a portion of said first component; and
   said substantially tubular structure is reversibly attachable to said second component.

5. The downhole clutch joint assembly of claim 1, wherein said engagement of said first ratchet sleeve and said portion of said first component comprises longitudinal first ratchet sleeve internal splines and longitudinal first component external splines.

6. A method of preventing reverse rotational motion, comprising:
   providing the downhole clutch joint assembly of claim 1; and
   rotating said first component;
   wherein:
   upon rotation of said first component in a first direction, said second component is concomitantly rotated in said first direction via said engagement between said first ratchet sleeve saw teeth and said second ratchet sleeve saw teeth; and
   upon rotation of said first component in a second direction, said second component substantially ceases to rotate, due to substantial disengagement of said first ratchet sleeve saw teeth from said second ratchet sleeve saw teeth.

7. The method of claim 6, wherein said ratchet sleeve assembly and said biasing member are provided in a fluidly sealed environment in relation to an exterior of said clutch joint assembly.

8. The method of claim 6, wherein said biasing member is a spring.

9. The method of claim 6, wherein said clutch joint assembly comprises a split nut;
   wherein:
   said split nut comprises a plurality of components cooperatively longitudinally arrangeable into a substantially tubular structure around at least a portion of said first component; and
   said substantially tubular structure is reversibly attachable to said second component.

10. The method of claim 6, wherein said engagement of said first ratchet sleeve and said portion of said first component comprises longitudinal first ratchet sleeve internal splines and longitudinal first component external splines.

11. A downhole clutch joint assembly comprising:
    a box end sub;
    a pin end sub;
    a ratchet sleeve assembly; and
    a biasing member;
    wherein said box end sub, said pin end sub, said ratchet sleeve assembly, and said biasing member are combined to provide said downhole clutch joint assembly;
    wherein:
    said ratchet sleeve assembly comprises:
    a substantially tubular first ratchet sleeve comprising a plurality of saw teeth proximate a first end thereof; and
    a substantially tubular second ratchet sleeve comprising a plurality of saw teeth proximate an end thereof;
    said first ratchet sleeve is positioned around, and engaged with, a portion of said box end sub;

said second ratchet sleeve is positioned within, and engaged with, a portion of said pin end sub;

said first ratchet sleeve saw teeth are disposed in engaging abutment with said second ratchet sleeve saw teeth;

said first ratchet sleeve is positioned longitudinally between said biasing member and said second ratchet sleeve;

said biasing member biases said first ratchet sleeve against said second ratchet sleeve;

upon rotation of said box end sub in a first direction, said first ratchet sleeve saw teeth engage said second ratchet sleeve saw teeth to induce rotation of said second ratchet sleeve, and thereby said pin end sub, in said first direction; and upon rotation of said box end sub in a second direction, said first ratchet sleeve saw teeth slidingly disengage from said second ratchet sleeve saw teeth and said pin end sub substantially ceases rotation.

12. The downhole clutch joint assembly of claim 11, wherein said ratchet sleeve assembly and said biasing member are provided in a fluidly sealed environment in relation to an exterior of said clutch joint assembly.

13. The downhole clutch joint assembly of claim 11, wherein said biasing member is a spring.

14. The downhole clutch joint assembly of claim 11, comprising a split nut;
wherein:
said split nut comprises a plurality of components cooperatively longitudinally arrangeable to form a substantially tubular structure around at least a portion of said box end sub; and
said substantially tubular structure is reversibly attachable to said pin end sub.

15. The downhole clutch joint assembly of claim 11, wherein said engagement of said first ratchet sleeve and said portion of said box end sub comprises longitudinal first ratchet sleeve internal splines and longitudinal box end sub external splines.

16. A method of preventing reverse rotational motion, comprising:
providing the downhole clutch joint assembly of claim 11; and
rotating said first component;
wherein:
upon rotation of said box end sub in a first direction, said pin end sub is concomitantly rotated in said first direction via said engagement between said first ratchet sleeve saw teeth and said second ratchet sleeve saw teeth; and
upon rotation of said box end sub in a second direction, said pin end sub substantially ceases to rotate, due to substantial disengagement of said first ratchet sleeve saw teeth from said second ratchet sleeve saw teeth.

17. The method of claim 16, wherein said ratchet sleeve assembly and said biasing member are provided in a fluidly sealed environment in relation to an exterior of said clutch joint assembly.

18. The method of claim 16, wherein said biasing member is a spring.

19. The method of claim 16, wherein said clutch joint assembly comprises a split nut;
wherein:
said split nut comprises a plurality of components cooperatively longitudinally arrangeable into a substantially tubular structure around at least a portion of said box end sub; and
said substantially tubular structure is reversibly attachable to said pin end sub.

20. The method of claim 16, wherein said engagement of said first ratchet sleeve and said portion of said box end sub comprises longitudinal first ratchet sleeve internal splines and longitudinal box end sub external splines.

* * * * *